(12) United States Patent
Banno et al.

(10) Patent No.: US 11,983,863 B2
(45) Date of Patent: May 14, 2024

(54) INSPECTION SYSTEM USING MACHINE LEARNING TO LABEL IMAGE SEGMENTS OF DEFECTS

(71) Applicants: Kabushiki Kaisha N-Tech, Gifu-ken (JP); Kabushiki Kaisha Yakult Honsha, Tokyo (JP); Tohoshoji Kabushiki Kaisha, Osaka (JP)

(72) Inventors: Kazumi Banno, Gifu-ken (JP); Yuichi Yamagishi, Gifu-ken (JP); Hiroyuki Kibe, Tokyo (JP); Kunimitsu Toyoshima, Osaka (JP)

(73) Assignee: Kabushiki Kaisha N-Tech, Gifu-Ken (JP)

( * ) Notice: Subject to any disclaimer, the term of this patent is extended or adjusted under 35 U.S.C. 154(b) by 634 days.

(21) Appl. No.: 17/258,056

(22) PCT Filed: Jul. 11, 2019

(86) PCT No.: PCT/JP2019/027529
§ 371 (c)(1),
(2) Date: Jan. 5, 2021

(87) PCT Pub. No.: WO2020/017427
PCT Pub. Date: Jan. 23, 2020

(65) Prior Publication Data
US 2021/0166374 A1    Jun. 3, 2021

(30) Foreign Application Priority Data
Jul. 20, 2018  (JP) .................................. 2018-137179

(51) Int. Cl.
*G06T 7/00*    (2017.01)
*G06F 18/21*    (2023.01)
(Continued)

(52) U.S. Cl.
CPC ............ *G06T 7/001* (2013.01); *G06F 18/214* (2023.01); *G06F 18/217* (2023.01);
(Continued)

(58) Field of Classification Search
CPC ......... G06T 7/001; G06T 7/0004; G06T 7/11; G06T 2207/20081; G06T 7/187;
(Continued)

(56) References Cited

U.S. PATENT DOCUMENTS

2015/0278710 A1    10/2015  Hisada

FOREIGN PATENT DOCUMENTS

| CN | 111080622 A | * | 4/2020 |
| JP | 2013125322 A | | 6/2013 |
| JP | 2015185149 A | | 10/2015 |

* cited by examiner

*Primary Examiner* — Hwa Andrew Lee
(74) *Attorney, Agent, or Firm* — Seager, Tufte & Wickhem LLP

(57) ABSTRACT

An alpha channel is added in addition to multiple channels forming an image of an item. A second pixel value differing from a first pixel value, which is assigned to a defect-free region, is assigned to a region corresponding to a defect region in the alpha channel. The image including the alpha channel is divided into multiple image segments. A defect label is assigned to the image segment in which the second pixel value is included in the alpha channel, and a non-defect label is assigned to the image segment, in which the second pixel value is not included in the alpha channel. The alpha channel is removed from the image segments to generate labeled image segment data.

10 Claims, 7 Drawing Sheets

(51) Int. Cl.
*G06F 18/214* (2023.01)
*G06F 18/2431* (2023.01)
*G06N 5/04* (2023.01)
*G06N 20/00* (2019.01)
*G06T 7/11* (2017.01)

(52) U.S. Cl.
CPC ........... *G06F 18/2431* (2023.01); *G06N 5/04* (2013.01); *G06N 20/00* (2019.01); *G06T 7/0004* (2013.01); *G06T 7/11* (2017.01); *G06T 2207/20081* (2013.01); *G06V 2201/06* (2022.01)

(58) Field of Classification Search
CPC . G06T 2207/20084; G06T 2207/30164; G06F 18/214; G06F 18/217; G06F 18/2431; G06N 5/04; G06N 20/00; G06N 3/045; G06N 3/084; G06V 2201/06
See application file for complete search history.

Fig.8
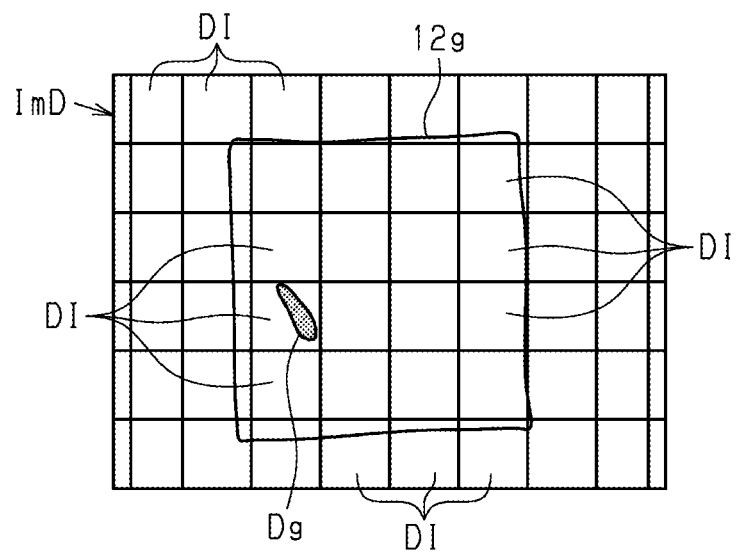
Fig.9A
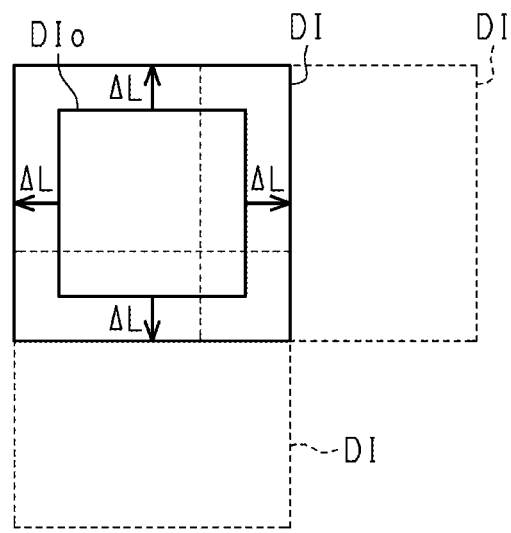
Fig.9B
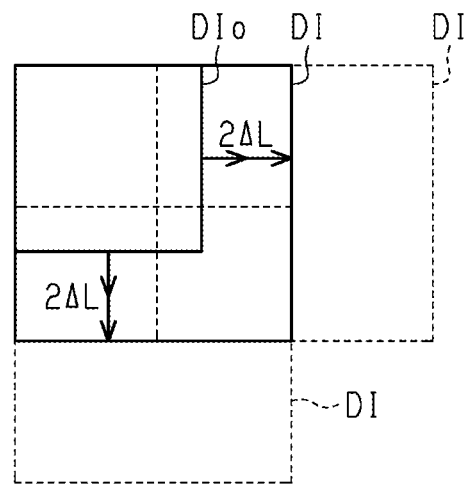
Fig.10A
Label Setting
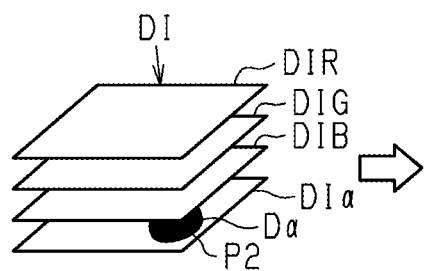
Fig.10B
RGB Image Extraction
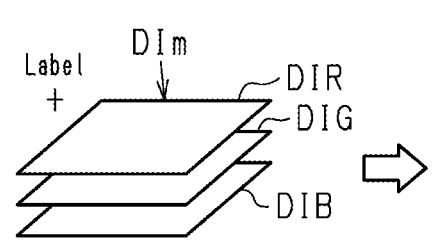
Fig.10C
Array Data Conversion
[[[10 30 110]
 [15 28 110]
 ⋮
 [60 80 45]
 [60 81 45]]]

INSPECTION SYSTEM USING MACHINE LEARNING TO LABEL IMAGE SEGMENTS OF DEFECTS

TECHNICAL FIELD

The present invention relates to a method for generating labeled image data, which is provided as teaching data to an identifier when performing supervised learning and the like, a method for inspection, a program, a labeled image data generation device, and an inspection device.

BACKGROUND ART

Patent Document 1 discloses an example of a learning device that divides image data including a correct label into pieces of data, performs additional learning, and adds stable outcomes of the additional learning to supervised images. The learning device includes an image generation unit, an image selection unit, an output unit, and a correct label setting unit. The image generation unit generates an unlabeled image based on a first image including a correct label. The image selection unit selects and presents an unlabeled image to a user. The output unit outputs the selected unlabeled image on a display. The correct label setting unit associates a correct label, which is obtained from an input unit, with the selected unlabeled image to set a second image including a correct label. A classifier generation unit performs a regeneration process of a classifier based on a feature vector of the first image including a correct label and a feature vector of the second image including a correct label.

Patent Document 2 discloses a machine learning device that generates teaching data through machine learning.

PRIOR ART DOCUMENTS

Patent Documents

Patent Document 1: Japanese Laid-Open Patent Publication No. 2013-125322
Patent Document 2: Japanese Laid-Open Patent Publication No. 2015-185149

SUMMARY OF THE INVENTION

Problem that the Invention is to Solve

In machine learning such as deep learning, a massive number of images need to be learned to determine a parameter of an identifier. For example, when an inspection is performed using an identifier, precision is improved if the image is divided as described in Patent Document 1. In this case, a label needs to be assigned to each image segment. Also, when an accuracy rate of the identifier is not sufficient, an identifier with a higher accuracy rate may be obtained by changing the number of segments of the image and performing the learning again.

Nonetheless, when the number of segments of an image is changed, a label needs to be reassigned to each image segment of the image for which the number of segments was changed. This type of problem is not limited to deep learning and widely occurs in supervised machine learning performed by a support vector machine (SVM) described in Patent Document 1 or the like.

The objective of the present invention is to provide a method for generating labeled image data, a method for inspection, a program, a labeled image data generation device, and a labeled image data inspection device that facilitate generation of labeled image data, which is generated by dividing images to be used as teaching data in supervised or semi-supervised machine learning, and reduce the cost of learning.

Means for Solving the Problem

Means and operational advantages for solving the above-described problem will now be described.

In a method for generating labeled image data that solves the above problem, the labeled image data is used as teaching data for having a pre-learning identifier perform supervised or semi-supervised machine learning to generate an identifier used for inspecting an inspection subject, of which an image is captured, for defects. The method includes a channel addition step, a pixel value assignment step, a segmentation step, a label assignment step, and a channel removal step. In the channel addition step, in addition to one or more channels forming the image, an other channel is added to the captured image of the inspection subject. In the pixel value assignment step, a second pixel value is assigned to a region corresponding to a defect region in the image in the other channel. The second pixel value differs from a first pixel value, which is assigned to an other region that is defect-free, as a pixel value indicating a defect. In the segmentation step, the image including the other channel is segmented into multiple image segments. In the label assignment step, a defect label is assigned to an image segment of the image segments, in which the second pixel value is included in the other channel, and a non-defect label is assigned to an image segment of the image segments, in which the second pixel value is not included in the other channel. In the channel removal step, the other channel is removed from the image segment to generate labeled image data.

With this method, even when the labeled image data used as teaching data is generated by dividing the captured image, the generation process is facilitated and the cost of learning is reduced. For example, even when the number of segments of the image is changed for regeneration of the labeled image data, a technician does not need to respecify the defect region in the image whenever the number of segments is changed. This facilitates the process and reduces the learning cost.

In the method for generating labeled image data, it is preferred that there be multiple types of the defect. Preferably, in the pixel value assignment step, when assigning the second pixel value to the other channel, a different second pixel value is assigned in accordance with the type of the defect. Further, it is preferred that in the label assignment step, a different defect label be assigned to the image segment including the second pixel value in accordance with the value of the second pixel value.

This method allows the labeled image data to be generated including a defect label that differs in accordance with the type of the defect.

In the method for generating labeled image data, it is preferred that in the segmentation step, the image including the other channel be segmented into the multiple image segments in which adjacent image segments are partially overlapped with each other.

With this method, even when the defect is shown over multiple image segments, the defect is split less frequently. Thus, a high accuracy rate is readily obtained when learning is performed using the labeled image data.

In the method for generating labeled image data, it is preferred that the other channel be an alpha channel.

With this method, the use of the alpha channel that sets the opacity of an image allows the second pixel value indicating a defect to be assigned to the region corresponds to the defect region relatively easily without affecting the channel of the captured image.

In the method for generating labeled image data, it is preferred that if an accuracy rate greater than or equal to a predetermined value is not obtained from an output when test data is input to the identifier generated by performing supervised or semi-supervised machine learning using the labeled image data as teaching data, the number of segments in the segmentation step be changed.

With this method, the image already includes the other channel and the second pixel value indicating a defect if an accuracy rate greater than or equal to a predetermined value is not obtained from the output when test data is input to the identifier, which is generated by performing supervised or semi-supervised machine learning, and the number of segments is changed to regenerate the labeled image data. Thus, when the number of segments of the image is changed to regenerate the labeled image data, there is no need for a technician to operate the input device to specify the defect region so that the region is specified and the second pixel value is assigned in the other channel.

A method for inspection that solves the above problem includes an identifier generation step and a determination step. In the identifier generation step, an identifier is generated by performing supervised or semi-supervised machine learning using labeled image data as teaching data, the labeled image data being generated by the method for generating labeled image data. In the determination step, multiple image segments are obtained by segmenting an image of an inspection subject into the number of segments that is the same as the number of segments of the image segments used for generating the identifier. Further, in the determination step, whether the inspection subject is defective is determined based on an output value output from the identifier as an identification result when the image segments are input to the identifier.

The method facilitates generation of the labeled image data used for learning of the pre-learning identifier thereby allowing the inspection subject to be inspected for defects at a lower learning cost.

In the method for inspection, it is preferred that the machine learning be deep learning.

This method allows the inspection subject to be inspected for defects at a lower learning cost through deep learning.

A program that solves the above problem is executed by a computer that generates labeled image data used as teaching data for having a pre-learning identifier perform supervised or semi-supervised machine learning to generate an identifier used for inspecting an inspection subject, of which an image is captured, for defects. The program includes a channel addition step, a pixel value assignment step, a segmentation step, a label assignment step, and a channel removal step. In the channel addition step, the computer adds, in addition to one or more channels forming the image, an other channel to the captured image of the inspection subject. In the pixel value assignment step, the computer assigns a second pixel value to a region corresponding to a defect region in the image in the other channel. The second pixel value differs from a first pixel value, which is assigned to an other region that is defect-free, as a pixel value indicating a defect. In the segmentation step, the computer segments the image including the other channel into multiple image segments. In the label assignment step, the computer assigns a defect label to an image segment of the image segments, in which the second pixel value is included in the other channel, and assigns a non-defect label to an image segment of the image segments, in which the second pixel value is not included in the other channel. In the channel removal step, the computer removes the other channel from the image segment to generate labeled image data.

The program is executed by the computer so that the generation process is facilitated for the labeled image data, which is generated by dividing the captured image and regenerated if the accuracy rate of the identifier that has completed learning is low by changing the number of segments, and that the learning cost is reduced. For example, even when the number of segments of the image is changed for regeneration of the labeled image data, a technician does not need to respecify the defect region in the image whenever the number of segments is changed. This facilitates the process and reduces the learning cost.

In a labeled image data generation device that solves the above program, the labeled image data is used as teaching data for having a pre-learning identifier perform supervised or semi-supervised machine learning to generate an identifier used for inspecting an inspection subject, of which an image is captured, for defects. The device includes a channel addition unit, a pixel value assignment unit, a segmentation unit, and a label assignment unit. The channel addition unit adds, in addition to one or more channels forming the image, an other channel to the captured image of the inspection subject. The pixel value assignment unit assigns a second pixel value to a region corresponding to a defect region in the image in the other channel. The second pixel value differs from a first pixel value, which is assigned to an other region that is defect-free, as a pixel value indicating a defect. The segmentation unit divides the image including the other channel into multiple image segments. The label assignment unit assigns a defect label to an image segment of the image segments, in which the second pixel value is included in the other channel, and assigns a non-defect label to an image segment of the image segments, in which the second pixel value is not included in the other channel. The label assignment unit further removes the other channel from the image segment after the label is assigned to generate labeled image data.

The labeled image data generation device facilitates generation of the labeled image data, which is generated by dividing the captured image and regenerated if the accuracy rate of the identifier that has complete learning is low by changing the number of segments, and lowers the learning cost. For example, even when the number of segments of the image is changed for regeneration of the labeled image data, a technician does not need to respecify the defect region in the image whenever the number of segments is changed. This facilitates the process and reduces the learning cost.

An inspection device that solves the above problem includes the labeled image data generation device, an identifier, an image segment acquisition unit, and a determination unit. The identifier is generated by performing supervised or semi-supervised machine learning using the labeled image data, which is generated by the labeled image data generation device, as teaching data. The image segment acquisition unit obtains multiple image segments by dividing an image of an inspection subject into the number of segments that is the same as the number of segments of the image segments used for generating the identifier. The determination unit determines whether the inspection subject is defective based on an output result from the identifier when the image segments obtained by the image segment acquisition unit is input to the identifier.

The inspection device facilitates generation of the labeled image data used for learning by the identifier that has not completed learning. Thus, the inspection subject can be inspected for defects at a lower learning cost.

Effects of the Invention

The present invention facilitates the generation process of the labeled image data even when the labeled image data, which is used as the teaching data in supervised or semi-supervised machine learning, is generated by dividing images and thus the learning cost is reduced.

BRIEF DESCRIPTION OF THE DRAWINGS

FIG. 8 is a schematic diagram illustrating segmentation of an image.

FIGS. 9A and 9B are schematic diagrams illustrating how to divide an image.

FIG. 10A is a schematic diagram illustrating a label setting, FIG. 10B is a schematic diagram showing labeled image segment data as teaching data, and FIG. 10C is a schematic diagram illustrating an array data conversion.

MODES FOR CARRYING OUT THE INVENTION

First Embodiment

An inspection system including an inspection device that has a machine learning functionality will now be described with reference to the drawings. An inspection system 11 shown in FIG. 1 inspects an item 12 for defects using an image of the item 12. The inspection system 11 includes a transfer device 20 and an inspection device 30. The transfer device 20 transfers the item 12, and the inspection device 30 inspects the item 12 transferred by the transfer device 20.

Figure 1:
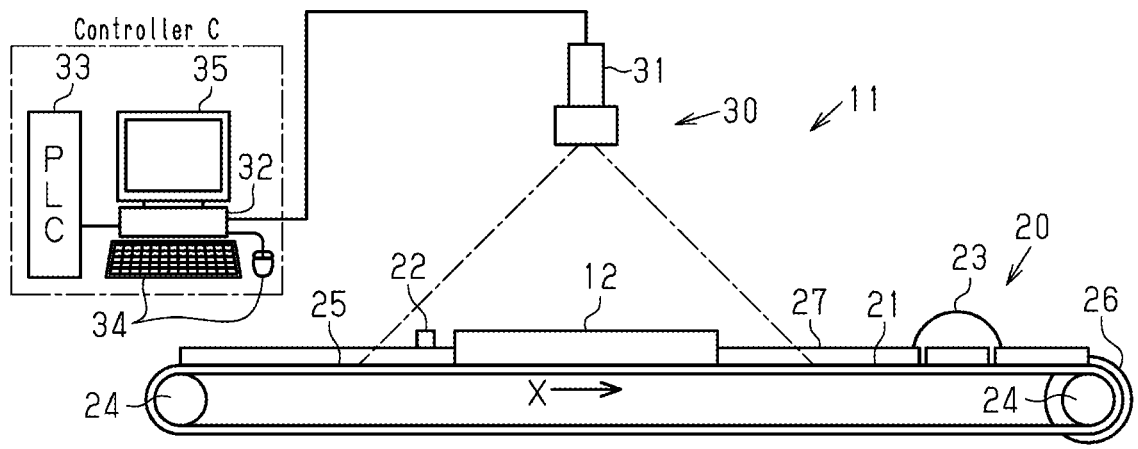
FIG. 1 is a schematic side view showing an inspection device that has a machine learning functionality in accordance with a first embodiment.

As shown in FIG. 1, the transfer device 20 includes a conveyor 21, a sensor 22, and a discarding device 23. The conveyor 21 conveys the item 12, and the sensor 22 detects the item 12 conveyed on the conveyor 21. When the item 12 is determined to be defective based on an inspection result of the inspection device 30, the discarding device 23 discards the defective item 12 from the production line of non-defective items. The conveyor 21 is, for example, a belt conveyor, in which a belt 25 running around rollers 24 is moved by the power of an electric motor 26. The conveyor 21 may have a different construction such as that of a roller conveyor as long as the item 12 can be conveyed. Two guide members 27 are arranged at two sides of the conveyor 21 in a widthwise direction that intersects a transfer direction X to guide the item 12. The discarding device 23 may be configured to discard the item 12 by pushing out the item 12 or blowing out the item 12 with air. The discarding device 23 may have any construction as long as the defective item 12 can be discarded.

The inspection system 11 includes a controller C that controls the transfer device 20 and the inspection device 30.

The inspection device 30 includes a camera 31 and a computer 32. The camera 31 captures an image of the item 12 conveyed by the conveyor 21, and the computer 32 is electrically connected to the camera 31. The inspection device 30 determines whether the item 12 is defective based on the image of the item 12 captured by the camera 31. The computer 32 forms part of the controller C. Specifically, the controller C includes a programmable logic controller 33 (hereafter, also referred to as "PLC 33") and the computer 32. The PLC 33 controls the transfer device 20 and the camera 31, and the computer 32 is electrically connected to the PLC 33. The computer 32 includes an input device 34 and a display 35.

The PLC 33 controls the transfer device 20 to control the image-capturing timing of the camera 31 based on a detection signal that indicates detection of the item 12 by the sensor 22. The image data of the item 12 captured by the camera 31 is sent to the computer 32. The computer 32 inspects the item 12 for defects using the image data sent from the camera 31. In the example shown in FIG. 1, the computer 32 is a personal computer or the like. Alternatively, the computer 32 may be a microprocessor or the like that is incorporated in the controller C, in which the computer 32 and the PLC 33 are integrated.

Figure 2:
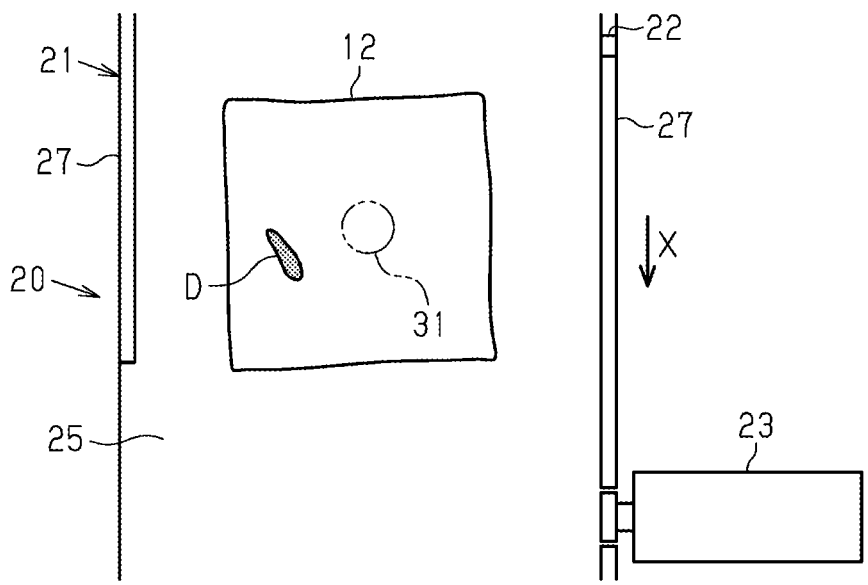
FIG. 2 is a schematic plan view showing a portion of the inspection device where an image of an item, which is an inspection subject, is captured.

In FIGS. 1 and 2, the example of the item 12 has the form of a rectangular plate. However, the item 12 may be any item having any shape and size.

Figure 4:
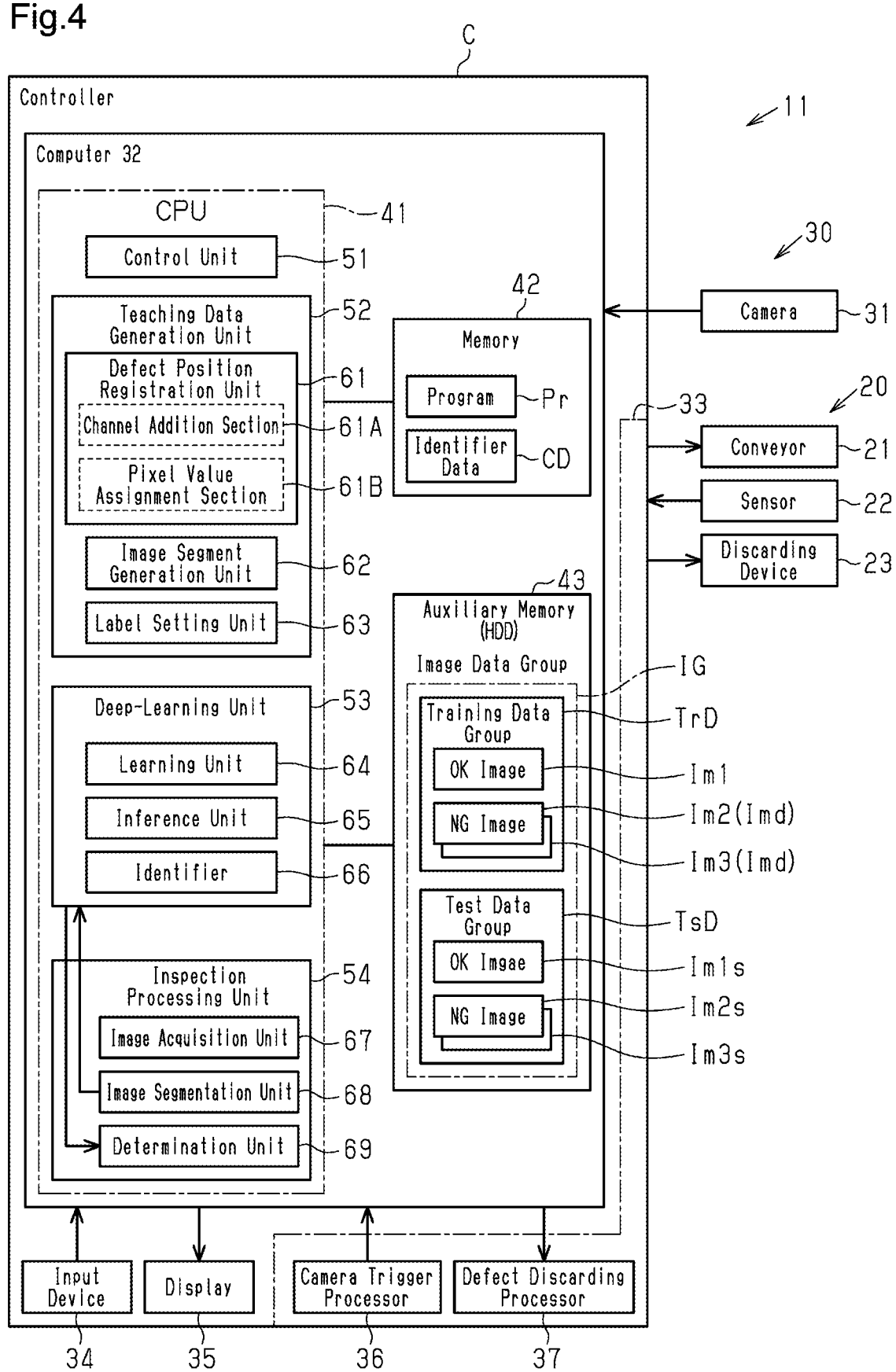
FIG. 4 is a block diagram showing the electrical configuration of the inspection device having the machine learning functionality.
Figure 5A:
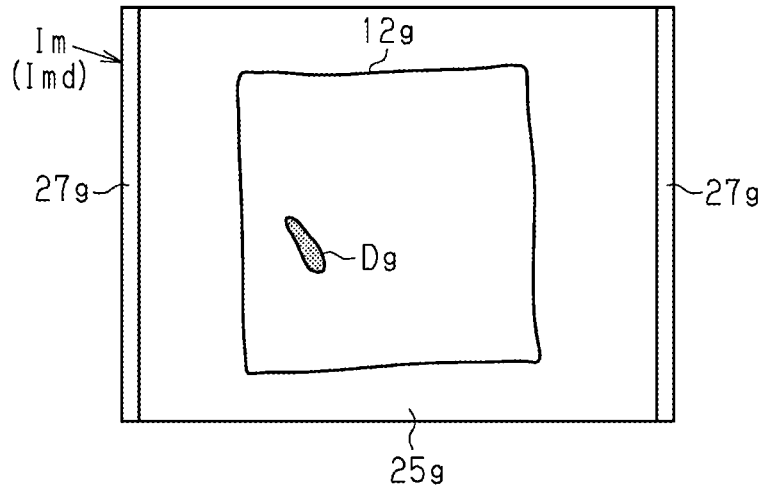
FIG. 5A is a schematic diagram showing a captured image.

As shown in FIG. 5A, in addition to an item 12g, the image captured by the camera 31 includes a belt 25g and part of guide members 27g located near the item 12g as part of the image. The inspection device 30 in the present embodiment inspects the item 12 for defects using an identifier 66 (refer to FIG. 4) based on the image data captured by the camera 31. When a defect is detected, the inspection device 30 also determines the type of the defect.

In the present embodiment, the inspection device 30 performs supervised learning to generate the identifier 66 required for the inspection. In the present example, deep learning is employed as machine learning. In deep learning, a large number of images need to be learned to obtain the identifier 66 with a high accuracy rate. However, it is troublesome to prepare a large number of training images. Accordingly, generation of labeled image data is simplified and modified so that regeneration of labeled image data resulting from a change in a condition will be facilitated.

The inspection device 30 generates, for example, labeled image segment data DIm (refer to FIG. 10B) as teaching data, which is a set of image segment data and a correct label. The image segment data is obtained by dividing the image of the item 12 captured by the camera 31. The correct label indicates whether the item 12 is defective and the type of the defect when the item 12 is defective. Then, the inspection device 30 performs supervised learning using the labeled image segment data DIm to generate the identifier 66.

Figure 3:
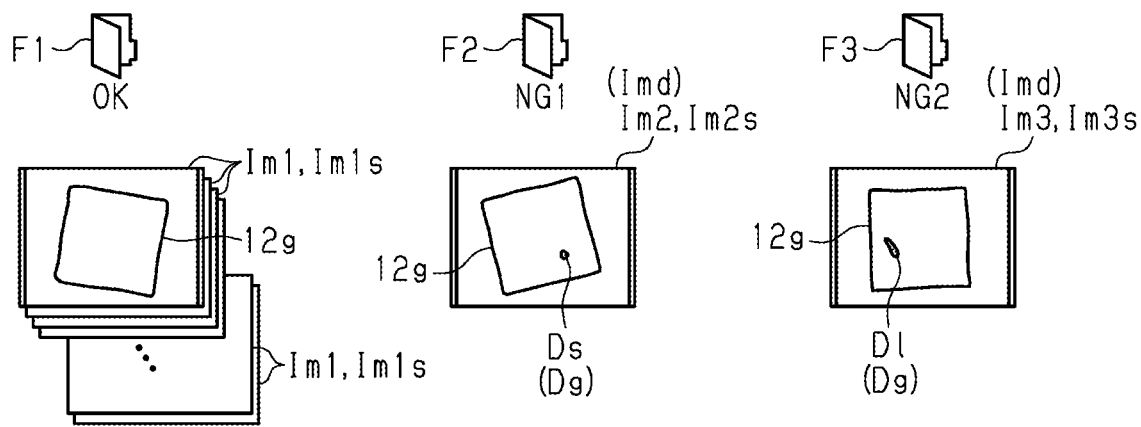
FIG. 3 is schematic diagram showing one example of multiple types of folders and images in the folders.

As shown in FIG. 3, image (original image) data used to generate teaching data is classified and stored in non-defective item folder F1 and defective item folders F2 and F3. The non-defective item folder F1 stores image data Im1 of non-defective items. Multiple types (two in example of FIG. 3) of the defective item folders F2 and F3 are prepared in correspondence with the types of defects. For example, the folder F2 stores image data Im2 of defective items having small defects Ds. Further, the folder F3 stores image data Im3 of defective items having large defects Dl. When the image data Im2 and Im3 is not particularly classified into the types of defects, the image data Im2 and Im3 may collectively be referred to as image data Imd. Also, the original images used to generate teaching data are not limited to the ones captured by the camera 31 of the inspection device 30 and may be images of the item 12 captured in advance at a different location by a camera that is separate from the inspection device 30. In this case, the image data may be input to the computer 32 from an external memory. Alternatively, the computer 32 may receive the image data via the internet from a server.

The electrical configuration of the inspection system 11 will now be described with reference to FIG. 4. As shown in FIG. 4, the controller C includes the computer 32 and the PLC 33. The conveyor 21, the sensor 22, and the discarding device 23, which form the transfer device 20, are electrically connected to the PLC 33. The PLC 33 includes a camera trigger processor 36 and a defect discarding processor 37. When a detection signal indicating detection of the item 12 is received from the sensor 22, the camera trigger processor 36 outputs an image capture trigger signal to the computer 32. The defect discarding processor 37 receives a discarding instruction signal from the computer 32 when the item 12 inspected by the computer 32 is defective.

The camera 31 is connected to the computer 32. The computer 32 is connected to the input device 34 and the display 35. When an image capture trigger signal is received from the camera trigger processor 36, the computer 32 outputs an image capture instruction signal to the camera 31. When the camera 31 receives the image capture instruction signal, the camera 31 captures an image of the item 12, which is detected by the sensor 22, at a central portion of an image capturing area on the conveyor 21. Further, the computer 32 performs an inspection process using the image data captured by the camera 31 and outputs a discarding instruction signal to the defect discarding processor 37 when determining that the item 12 includes a defect and is defective. The defect discarding processor 37 drives the discarding device 23 based on the discarding instruction signal received from the computer 32 to discard the defective item 12 from the conveyor 21.

The computer 32 of the inspection device 30 will now be described with reference to FIG. 4. As shown in FIG. 4, the computer 32 includes a computer processing unit (CPU) 41, a memory 42, and an auxiliary memory 43. The auxiliary memory 43 is, for example, formed by a hard disk drive (HDD).

Figure 12:
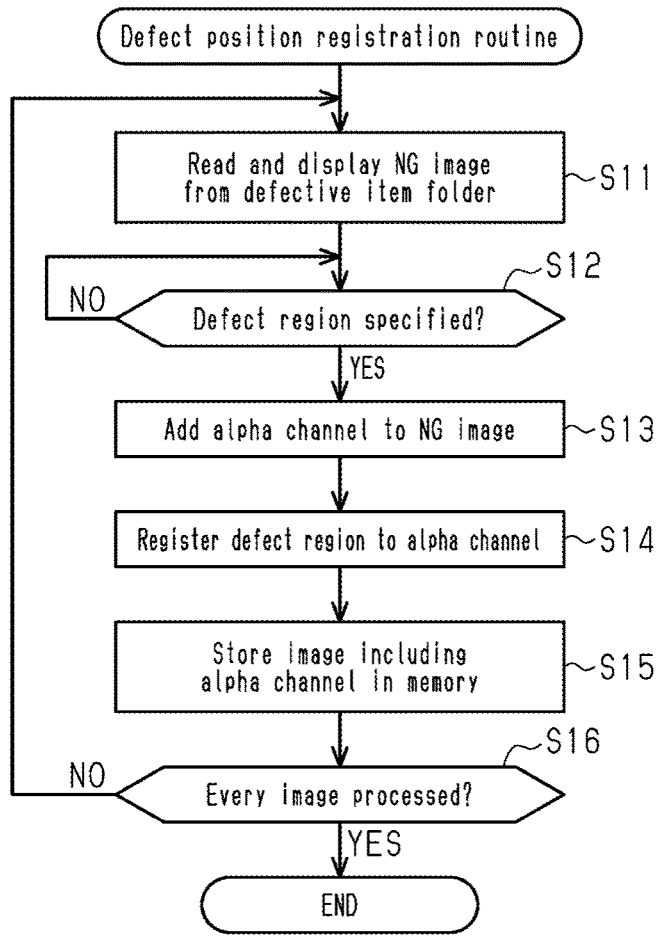
FIG. 12 is a flowchart illustrating a defect position registration routine.

The memory 42 stores various types of programs Pr and identifier data CD. The programs Pr include a program for defect position registration illustrated by the flowchart in FIG. 12 and a program for image segment generation illustrated by the flowchart in FIG. 13. The identifier data CD includes model data and a parameter that form the identifier 66. The CPU 41 reads the identifier data CD to function as the identifier 66. In a state in which the identifier 66 has not completed learning, that is, when the identifier 66 is in a state of pre-learning or learning, an identification result will not have the desired accuracy rate. Accordingly, a learning unit 64 performs supervised learning on the identifier 66 to adjust the parameter forming the identifier data CD to an optimal value. In this manner, in accordance with the level of learning, the identifier 66 includes an identifier 66 that has completed learning and an identifier 66 that has not completed learning. The identifier 66, which has completed learning, has the desired accuracy rate. The identifier 66, which has not completed learning, is in a state of pre-learning or learning and does not have the desired accuracy rate. Even when the identifier 66 becomes the identifier 66 that has completed learning, the identifier 66 that has completed learning does not finish learning and performs additional learning to obtain a higher accuracy rate or adjust the accuracy rate when subtle changes in the form or the like of a defect of the same item 12 lowers the accuracy rate.

Thus, in a state in which the identifier 66 has not completed learning, the identifier data CD is formed by model data and an unadjusted parameter. In a state in which the identifier 66 has completed learning, the identifier data CD is formed by model data and the parameter that has been adjusted through supervised learning performed by the identifier 66 that has not completed learning. The CPU 41 reads the identifier data CD including model data and the parameter adjusted through supervised learning to function as the identifier 66 that has completed learning. The programs Pr include a program used by a teaching data generation unit 52, which will be described later, to generate teaching data provided for learning from the learning unit 64 to the identifier 66 that has not completed learning.

The CPU 41 includes a control unit 51, the teaching data generation unit 52, a deep-learning unit 53, and an inspection processing unit 54. Each of the units 51 to 54 is a functional unit formed by software configured by the programs Pr executed by the CPU 41. The control unit 51 comprehensively controls the units 52 to 54.

The teaching data generation unit 52 generates teaching data that is provided by the learning unit 64 to the identifier 66 that has not completed learning when performing supervised learning. The teaching data generation unit 52 includes a defect position registration unit 61, an image segment generation unit 62, and a label setting unit 63. The image segment generation unit 62 serves as one example of a segmentation unit, and the label setting unit 63 serves as one example of a label assignment unit. In addition to the teaching data provided by the learning unit 64 to the identifier 66 for supervised learning, the teaching data generation unit 52 also generates teaching data that is provided by an inference unit 65, which will be described later, to the identifier 66 as test data for verifying whether the identifier 66 can obtain a desirable accuracy rate as a result of the supervised learning. In the present embodiment, the teaching data generation unit 52 corresponds to one example of a labeled image data generation device.

The deep-learning unit 53 includes the learning unit 64, the inference unit 65, and the identifier 66. The learning unit 64 generates an identifier 66 that has completed learning by having the identifier 66 that has not completed learning perform supervised learning using teaching data. In the present example, machine learning is deep learning. The learning unit 64 performs supervised learning by providing the teaching data generated by the teaching data generation unit 52 to the identifier 66 so that a parameter such as a weight coefficient is adjusted to an optimal value.

The auxiliary memory 43 stores an image data group IG, which is shown in FIG. 4. The image data group IG includes pieces of image data Im (hereafter, also simply referred to as "image Im") that serve as original images when the teaching data generation unit 52 generates teaching data. In the example shown in FIG. 4, the image data group IG includes a training data group TrD and a test data group TsD. The image data Im belonging to the training data group TrD serves as the original image data when the teaching data generation unit 52 generates teaching data for supervised learning. The training data group TrD contains OK image Im1 and NG image Imd (Im2 and Im3) shown in FIG. 3. As shown in FIG. 3, the folder F1 that is named "OK" stores OK image data Im1, the folder F2 that is named "NG1" stores NG1 image data Im2, and the folder F3 that is named "NG2" stores NG2 image data Im3. In this manner, in the present example, the NG image data Imd is classified and stored in multiple types of the folders F2 and F3 named in accordance with the size or the type of defects.

Further, the image data Im belonging to the test data group TsD serves as original image data when the teaching data generation unit 52 generates teaching data for the inference unit 65 to test the accuracy rate of the identifier 66. The test data group TsD includes pieces of image data differing from that of the training data group TrD. In the same manner as the training data group TrD, the test data group TsD includes OK image Im1s and NG images Im2s and Im3s that are classified into the folders F1 to F3 named as shown in FIG. 3. In the present embodiment, the names of the folders F1 to F3 are used as correct labels assigned to data when the teaching data generation unit 52 generates teaching data from the images Im. In FIG. 4, the image data group IG for only a single type of the item 12 is shown in the auxiliary memory 43. When multiple types of the items 12 are inspected, the image data groups IG will be stored according to type. In this case, the identifier data CD and the identifiers 66 will also be arranged in accordance with type. Further, when the same item 12 has multiple portions as inspection subjects, the image data group IG, the identifier data CD, and the identifier 66 will be arranged for each of the inspection subject portions.

The elements of the teaching data generation unit 52 will now be described with reference to FIG. 4. The defect position registration unit 61 registers the position of a defect to the ones of images Imd including a defect. When the region and the position of a defect is specified and input by a technician using the input device 34, the defect position registration unit 61 adds a channel other than a color expression channel that expresses the color of the image Imd to the defect image Imd. The other channel is an auxiliary channel added to the color expression channel. The auxiliary channel is, for example, a channel expressing opacity. In the present example, the auxiliary channel is an alpha channel Imα. The defect position registration unit 61 appends the alpha channel Imα to the defect image Imd in addition to the color expression channel. Then, the defect position registration unit 61 registers the region and the position of the defect to the alpha channel Imα.

The image segment generation unit 62 divides the image data Im and generates multiple pieces of image segment data DI. A technician operates the input device 34 to instruct the number of segments to the image segment generation unit 62. The image segment generation unit 62 divides the image data Im by the instructed number of segments M×N to generate M×N pieces of the image segment data DI (hereafter, also referred to as "image segment DI").

The label setting unit 63 assigns labels to the image segments DI. When the image segment data includes the alpha channel, the label setting unit 63 determines whether a second pixel value that indicates a defect is included. If the second pixel value is included, the label setting unit 63 assigns "NG1" or "NG2", which is the name of the folder (folder name) that stores the original image, to the image segment data as a label. When the image segment data includes the α channel but not the second pixel value indicating a defect, the label setting unit 63 assigns "OK" to the image segment data as a label. When the image segment data does not include the alpha channel, the label setting unit 63 assigns "OK", which is the name of the folder (folder name) that stores the original image, to the image segment data as a label. After the labels are assigned, the label setting unit 63 removes the alpha channels from the image segments to generate the labeled image segment data DIm (refer to FIG. 10B) as teaching data formed by labeled RGB images.

The learning unit 64 in the deep-learning unit 53 has the identifier 66 that has not completed learning perform supervised learning using the labeled image data as teaching data. The learning unit 64 in the deep-learning unit 53 has the identifier 66 learn the teaching data to generate the identifier 66 that has completed learning.

In the present example, machine learning is deep learning. The learning unit 64 has the identifier 66 learn the teaching data to determine a parameter.

The inference unit 65 inputs images of an inspection subject to the identifier 66 and uses the identifier 66 that has completed learning to inspect for defects based on an output result obtained through deep learning. The inspection through deep learning also determines the type of a defect when a defect is detected. Further, the inference unit 65 is used not only for the actual inspection but also for verifying whether the learning result is appropriate. The inference unit 65 inputs the labeled image segment data DIm, which is generated by the teaching data generation unit 52 using the image data Im in the test data group TsD as original images, to the identifier 66 that has completed learning and compares the output results with the correct labels to test the accuracy rate. When the obtained accuracy rate is higher than or equal to a predetermined value, the learning ends. When the obtained accuracy rate is lower than the predetermined value, learning is performed again after changing a condition by changing the number of segments of the image data Im or the like.

The inspection processing unit 54 shown in FIG. 4 inspects the item 12, which is the inspection subject captured by the camera 31, using the identifier 66. The inspection processing unit 54 includes an image acquisition unit 67, an image segmentation unit 68 serving as one example of an image segment acquisition unit, and a determination unit 69. The image acquisition unit 67 obtains the image of the item 12 captured by the camera 31. The image segmentation unit 68 divides the images obtained by the image acquisition unit 67 into the number of segments that is same as that of the labeled image segment data DIm, which was used by the learning unit 64 as the teaching data for supervised learning. The inspection processing unit 54 sends the image segments divided by the image segmentation unit 68 to the deep-learning unit 53. In the deep-learning unit 53, the inference unit 65 inputs the image segments DI received from the image segmentation unit 68 of the inspection processing unit 54 to the identifier 66 to infer which one of "OK", "NG1", and "NG2" is appropriate based on the output results of the identifier 66. The inference result of the inference unit 65 is transmitted from the deep-learning unit 53 to the determination unit 69 of the inspection processing unit 54. In the inspection processing unit 54, the determination unit 69 evaluates the inspection based on the inference result from the deep-learning unit 53. The determination unit 69 determines whether the item 12 has a defect based on the inference result of one of "OK", "NG1", and "NG2". In the present example, the determination unit 69 determines that the item 12 is non-defective when the inference result is "OK" and determines that the item 12 is defective when the inference result is "NG1" or "NG2".

When the inspection result indicates that the item 12 is defective based on the determination result of the inspection processing unit 54, the computer 32 outputs a discarding instruction signal to the defect discarding processor 37. When the discarding instruction signal is received, the defect discarding processor 37 drives the discarding device 23 to discard the defective item 12 from the conveyor 21.

Figure 5B:
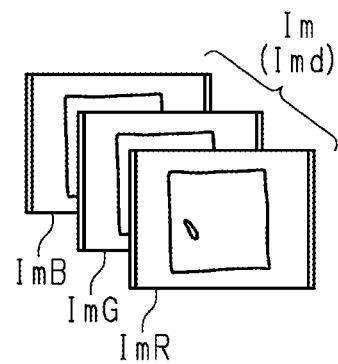
FIG. 5B is a schematic diagram showing the channel structure of the captured image.

FIG. 5A shows one example of the image data Im captured by the camera 31. The image data Im is the image data Imd of a defective item (also referred to as "NG image data Imd") including a defect Dg. As shown in FIG. 5A, the image Im captured by the camera 31 includes the item 12g, the belt 25g, and the guide members 27g. The camera 31 is configured to capture a color image. As shown in FIG. 5B, the image Im captured by the camera 31 is configured by three channels, namely, a red channel (R-channel), a green channel (G-channel), and a blue channel (B-channel).

A technician operates a mouse to open the defective item folder F2 or F3 from a list of the folders shown on the display 35 and select the defective item image Imd so that the defective item image Imd of the item 12g that includes the defect Dg (also referred to as "NG image Imd") is shown on the display 35. For example, the NG image Imd including the defect Dg shown in FIG. 5A is displayed. The technician uses a pointing device such as the mouse of the input device 34 or an electronic pen (stylus pen) to specify and input the region of the defect Dg in the NG image Imd.

Figure 6A:
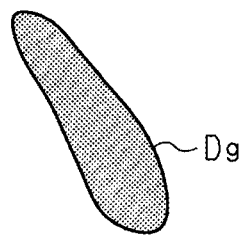
FIG. 6A is a schematic diagram showing a defect in the image.
Figure 6B:
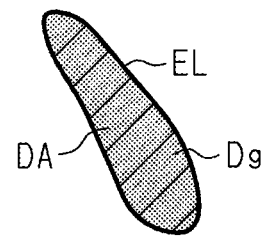
FIG. 6B is a schematic diagram illustrating a method for specifying and inputting a defect region.

FIG. 6A shows the defect Dg in the NG image Imd of FIG. 5A. When the defect Dg is as shown in FIG. 6A, the technician operates the pointing device such as the mouse or an electric pen that forms the input device 34 to draw a border line EL, which is indicated by the solid line in FIG. 6B, along the contour of the defect Dg to outline a defect region DA. Alternatively, the technician operates the pointing device to fill in the defect region DA so that position coordinates of the defect region are specified and input.

The defect position registration unit 61 includes a channel addition section 61A and a pixel value assignment section 61B. When the channel addition section 61A receives an input that specifies the position coordinates of the defect region DA from the input device 34, the channel addition section 61A adds the alpha channel Imα to the NG image data Imd. Then, the pixel value assignment section 61B assigns a second pixel value P2 as the pixel value that indicates a defect to a region Da (hereafter, also referred to as "defect region Da") corresponding to the defect region DA in the alpha channel. The second pixel value P2 differs from a first pixel value P1 that is assigned to a defect-free region. The pixel value assignment section 61B assigns the second pixel value P2 to every pixel belonging to the defect region Da that is defined in the alpha channel Imα by the position coordinates, which are the same as the position coordinates of the defect region DA specified on the NG image Imd.

Figure 7:
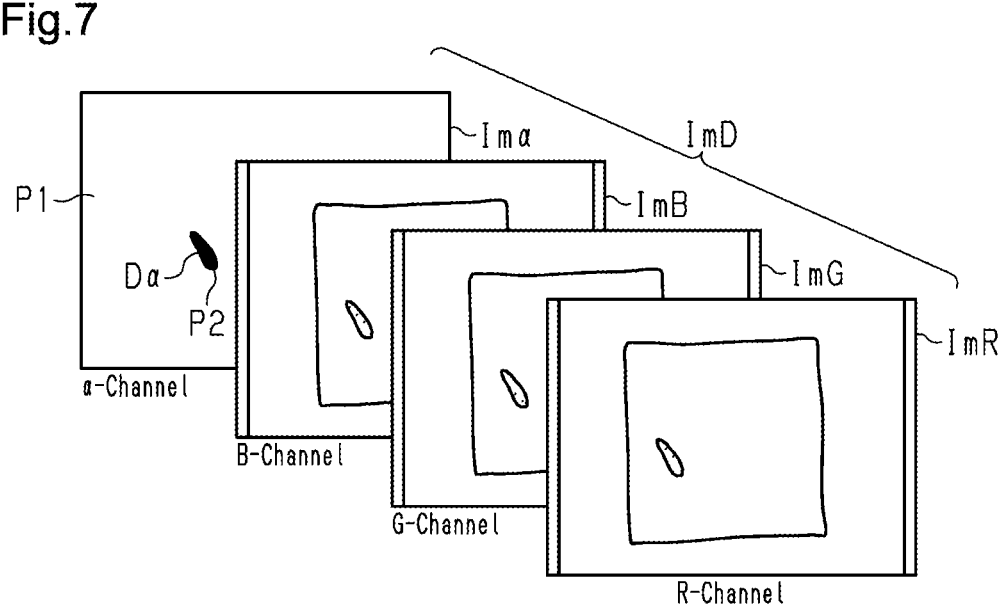
FIG. 7 is a schematic diagram showing the structure of an image including an alpha channel.

As shown in FIG. 7, after the defect position is registered, the image ImD of a defective item (also referred to as NG image ImD) is formed by a R-channel ImR, a G-channel ImG, a B-channel ImB, and the alpha channel Imα, in which the second pixel values P2 are assigned to the defect region Da. After the defect position is registered, the NG image ImD is stored in the folder F2 or F3, which is the same folder as the original image. Alternatively, after the defect position is registered, the NG image is stored in the folder F2 or F3, which differs from that of the original image but has the same folder name as that of the original image.

The image segment generation unit 62 divides the images Im, which are for learning, stored in the folders F1 to F3. The images Im of the segmentation subject for the image segment generation unit 62 are the OK images Im1 in the non-defective item folder F1 and the NG images ImD including the alpha channel Imα in the defective item folders F2 and F3. The image segment generation unit 62 displays an input field for the number of segments on the display 35. A technician operates the input device 34 to input the number of segments that is appropriate for learning. The number of segments of an image is specified by inputting number M of vertical segmentation and number N of lateral segmentation of an image. Here, M and N are natural numbers, and at least one of M and N is greater than or equal to two.

As shown in FIG. 8, the image segment generation unit 62 divides the image data Im into M×N. This generates M×N of the image segments DI. As shown in FIG. 8, M×N of the image segments DI are classified into K of image segments including at least part of the defect and (M×N−K) of image segments not including the defect. The image segments DI further include ones without any portion of the item 12g. FIG. 8 shows an example in which the image Im is divided into 48, or 6×8.

In the present embodiment, it is preferred that the image segment generation unit 62 divide the image data Im in a manner so that boundaries between two segments located next to each other are partially overlapped with each other. As shown in FIG. 9A, when an other image segment is located next to the image segment DIo at both sides in the vertical direction and the lateral direction, the image segment generation unit 62 expands the image segment DIo toward both sides in the vertical direction and the lateral direction by an overlap amount ΔL.

Also, when the image segment DI is located along an edge of the image data Im, an other image segment does not exist at the outer side of the image segment DI in at least one of the vertical direction and the lateral direction. With respect to the direction in which an other image segment does not exist next to the image segment DIo, the image segment generation unit 62 expands the image segment DIo toward the side where an other image segment exists by a length two times greater than the overlap amount ΔL. For example, as shown in FIG. 9B, for the image segment DIo located at the upper left corner of the image data Im, an other image segment exists only in the downward direction and the rightward direction. Accordingly, the image segment generation unit 62 expands the image segment DIo shown in FIG. 9B downward and rightward each by a length two times greater than the overlap amount ΔL. In this manner, the image Im is divided into multiple image segments DI having the same size and partially overlapped with the adjacent image segments DI.

After every image Im in the folders F1 to F3 is divided into M×N of the image segments DI, the label setting unit 63 then assigns correct labels (hereafter, referred to simply as "labels") to the image segments DI. Specifically, the label setting unit 63 generates a set of data associating the image segment DI with a label.

As shown in FIG. 10A, for the image segment DI obtained from the defective item image ImD, the label setting is performed using the image segment DI to which the alpha channel DIα (hereafter, also denoted by "α-channel DIα") is added. The image segment generation unit 62 sets the label of the non-defective item image segment DI to "OK" that is the name of the folder F1 to which the original image of the image segment DI belongs. The image segment DI obtained from the defective item image ImD is formed by a R-channel DIR, a G-channel DIG, a B-channel DIB, and an α-channel DIα.

As shown in FIG. 10A, for the image segment DI, of which the original image belongs to the defective item folder F2 or F3, the image segment generation unit 62 sets the label to the name "NG1" or "NG2" of the folder F2 or F3 of the original image when the second pixel value P2 indicating a defect is included in the α-channel DIα of the image segment DI. For the image segment DI that does not include the second pixel value P2, the image segment generation unit 62 sets the label to "OK" regardless of whether the original image belongs to the folder F2 or F3.

After a label is set to every image segment DI, the label setting unit 63 extracts the RGB image with the label from the labeled image segment DI as shown in FIG. 10B. In other words, the label setting unit 63 removes the α-channel DIα from the image segment DI to obtain the labeled image segment data DIm (hereafter, also referred to as "teaching data DIm") as teaching data. Subsequently, as shown in FIG. 10C, when the labeled image segment data DIm is received, the learning unit 64 converts the image segment data of the labeled image segment data DIm into array data without the label. In array data, the pixel value of every pixel in the image segment DI are arranged in a predetermined sequence.

Figure 11:
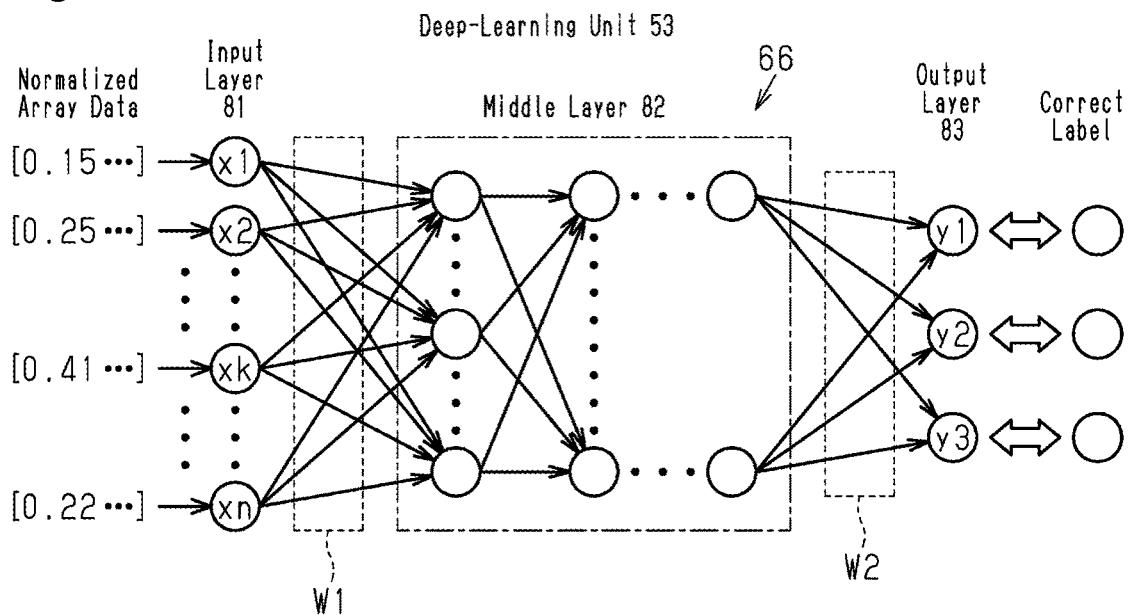
FIG. 11 is a schematic diagram illustrating supervised learning of an identifier in a deep-learning unit.

As shown in FIG. 11, the deep-learning unit 53 includes the identifier 66. When learning is performed, the identifier 66 is in a state prior to completion of learning (includes pre-learning or pre-transfer learning). When the learning unit 64 provides teaching data to the identifier 66 so that a desirable accuracy rate is obtained as a result of the supervised learning, the identifier 66 completes learning. In other words, the learning unit 64 has the identifier 66 that has not completed learning perform supervised learning to generate the identifier 66 that has completed learning. The configuration of the identifier 66 will now be described without particularly distinguishing before learning and after learning.

The identifier 66 has a model of a neural network. For example, a convolutional neural network or the like is employed as the model. The identifier 66 includes an input layer 81, a middle layer (hidden layer) 82, and an output layer 83. The input layer 81 includes perceptrons. In the example shown in FIG. 11, the number of perceptrons included is "n" (x1, ... xk, ... xn). For example, when the image segment DI is image data including 50×50 pixels, or a total of 2500 pixels, the array data is formed by an array of 7500 pieces of pixel value data since one pixel has three pixel values, namely, an R-value, a G-value, and a B-value. In the example, the input layer 81 includes 7500 perceptrons (x1 to xn (n=7500)). The middle layer 82 includes multiple layers formed by perceptrons. The output layer 83 includes the same number of perceptrons as that of the correct labels. The perceptrons in the output layer 83 output the output results.

When dividing an image, precision is provided as described below. In the image Im, when the number of pixels of the defect Dg is denoted by TP (true positive) and the number of pixels of the defect-free region is denoted by FP (false positive), precision Prec1 is expressed by Prec1=TP/(TP+FP). When the image Im is divided by M×N and if an entire defect is included in one image segment, precision Prec2 is expressed by TP/(TP+(FP/(M×N))). That is, the precision Prec2 can be expressed by Prec2≈(M×N) Prec1. Accordingly, when the labeled image segment data Dim, which is obtained by dividing the image Im by (N×M), is used as teaching data, the precision is increased by approximately (M×N) times. Thus, when the image segment data DIm having a high precision is used for supervised learning, the generated identifier 66 has a high accuracy rate.

The operation of the inspection device 30 will now be described. First, a defect position registration process that is performed when the computer 32 executes a program will be described with reference to FIG. 12. This process is performed by the defect position registration unit 61 of the teaching data generation unit 52. For example, a technician starts an application software stored in the computer 32 for generation of labeled image data. The technician operates the input device 34 on the application software to specify a folder that contains an original image for generating labeled image data. Specifically, the technician specifies the defective item folder F2 or F3 that contains the NG image Imd to display on the computer 32. The technician may operate the mouse forming the input device 34 to open the folder and individually select the NG image Imd to display on the computer 32.

In step S11, the computer 32 reads the NG image from a defective item folder and displays the image. Specifically, the computer 32 reads the first NG image Imd from the specified defective item folder F2 or F3 of the folders F1 to F3 stored in the auxiliary memory 43 and displays the image on the display 35.

On the NG image Imd shown on the display 35, the technician outlines the defect Dg with the border line EL along the contour using the pointing device such as a mouse or an electronic pen in accordance with a message shown on the display 35 to specify the defect region DA.

In step S12, the computer 32 determines whether the defect region DA has been specified. When the technician operates the pointing device to connect the start point and the end point of the border line EL so that the outlined region is defined, the computer 32 determines that the defect region DA has been specified. When the defect region DA has been specified, the computer 32 visually notifies the technician of the specified region, for example, by filling the specified region with a predetermined color, as indicated by the cross-hatching in FIG. 6B.

In step S13, the computer 32 adds the alpha channel Imα to the NG image Imd. That is, the computer 32 adds an other channel to the three RGB color expression channels, which form the NG image Imd. In the present embodiment, the other channel is the alpha channel Imα serving as an auxiliary channel that expresses the opacity of an image with a pixel value. In this manner, as shown in FIG. 7, the image ImD including the alpha channel is formed by four channels, namely, the R-channel ImR, the G-channel ImG, the B-channel ImB, and the alpha channel Imα. In the present embodiment, the process of step S13 corresponds to one example of "channel addition step" in which an other channel is appended to an image of the inspection subject in addition to one or more channels forming the image.

In step S14, the computer 32 registers the defect region DA to the alpha channel Imα. Specifically, the computer 32 adds the second pixel value P2 to the region Dα as the pixel value indicting a defect. The second pixel value P2 differs from the first pixel value P1, which is added to a defect-free region other than the region Dα. The region Dα corresponds to the defect region DA in the alpha channel Imα. In the example shown in FIG. 7, the computer 32 registers the second pixel value P2, which is indicated by the black color in FIG. 7, to the region Dα corresponding to the defect region DA in the α-channel Imα, or the defect region Dα in the α-channel Imα. Then, the computer 32 adds the first pixel value P1, which is indicated by the white color in FIG. 7, to the defect-free region in the α-channel Imα. For example, the first pixel value P1 is the initial value of the α-channel Imα and is set to the value of 100% opacity or the like. The second pixel value P2$a$ is set to a value other than 100% opacity. Any pixel value can be set as the first pixel value and the second pixel value as long as the values are different. For example, when the pixel value of the image is 256 gradations, the first pixel value may be "255" and the second pixel value may be "0", or vice versa. In the present embodiment, the process of step S14 corresponds to one example of "pixel value assignment step" in which the second pixel value is assigned to the region corresponding to the defect region in the other channel of the image as the pixel value indicating a defect. The second pixel value differs from the first pixel value, which is assigned to the defect-free region in the other channel of the image.

In step S15, the image ImD including the alpha channel is stored in the memory 43. Thus, the memory 43 stores the NG image ImD with the alpha channel, in which the second pixel value P2 is assigned to the region Dα corresponding to the defect region DA in the alpha channel Imα.

In step S16, the computer 32 determines whether every image has been processed. If every image has not been processed, the computer 32 returns to step S11 and repeats steps S11 to S15 on a subsequent NG image Imd. In the present example, when the processes of steps S11 to S15 are performed on every NG image Imd in the defective item folders F2 and F3, an affirmative determination is given in step S16 and the defect position registration process ends. In this manner, the NG images ImD including the alpha channel are kept in the folders F2 and F3 in correspondence with the type of defects and stored in the memory 43.

Figure 13:
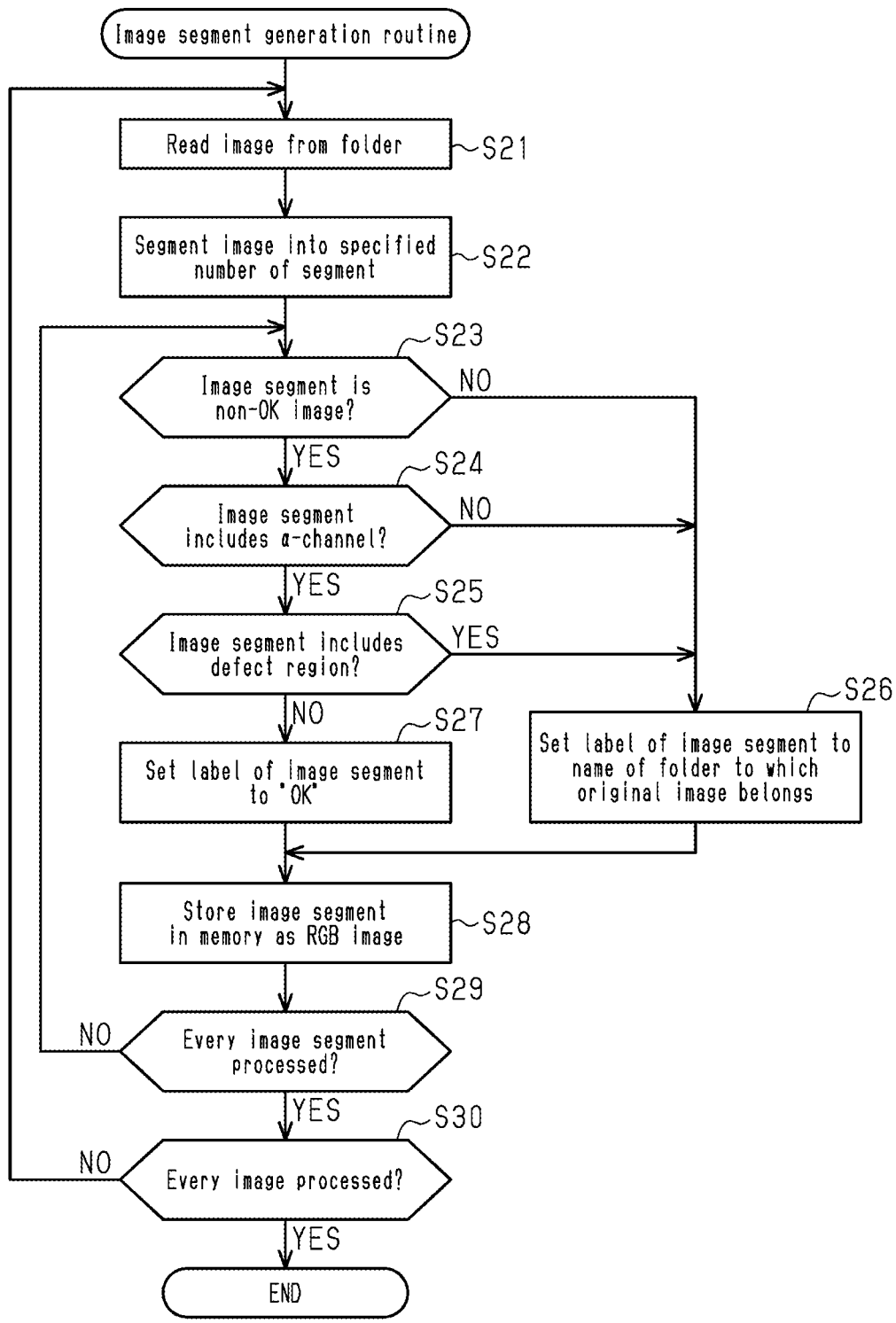
FIG. 13 is a flowchart illustrating an image segment generation routine in which labeled image segments are generated as teaching data.

An image segment generation process will now be described with reference to FIG. 13. After the defect position registration process illustrated in FIG. 12 ends, the computer 32 performs an image segment generation routine illustrated in FIG. 13. The image segment generation process is performed by the image segment generation unit 62 and the label setting unit 63. In advance, a technician operates the mouse or the like to specify and input a desirable number of segments M×N in input field of the number of segments on a setting screen shown on the display 35 by the application software.

In step S21, the computer 32 reads images from the folders F1 to F3. The computer 32 first reads the first image Im.

In step S22, the computer 32 segments the image Im into the specified number of segments. As shown in FIG. 8, the image Im is divided into the specified number of segments M×N of the image segments DI. In this case, as shown in FIGS. 9A and 9B, the image Im is divided into M×N of the image segments DI having the same size and overlapped with the adjacent image segments DI by the overlap amount ΔL or 2·ΔL. The computer 32 sets a label to each image segment DI in steps S23 to S27 as described below. In the present embodiment, the process of step S22 corresponds to one example of "segmentation step" in which an image including the other channel is segmented into multiple image segments.

In step S23, the computer 32 determines whether the image segment DI is an OK image. Here, the OK image refers to the image segment DI divided from an OK image stored in the folder F1 named "OK". In other words, when the original image of the image segment DI belongs to the folder named "OK", the image segment DI is an OK image. When the image segment DI is not an OK image, the computer 32 proceeds to step S24. When the image segment DI is an OK image, the computer 32 proceeds to step S26.

In step S26, the computer 32 sets the label of the image segment DI to the name of the folder to which the original image belongs. For example, for the image segment DI determined as an OK image in step S23, the computer 32 sets the label of "OK", which is the name of the folder F1 to which the original image belongs.

In step S24, the computer 32 determines whether the image segment DI includes the α-channel That is, the computer 32 determines whether the image segment DI is divided from an NG image ImD with the α-channel and a technician has performed the defect position registration process so that the image segment DI includes the α-channel DIα. When the image segment DI includes the α-channel, the computer 32 proceeds to step S25. When the image segment DI does not include the α-channel, the computer 32 proceeds to step S26. For example, the image segment DI does not include the α-channel when the original image of the image segment DI belongs to the defective item folder F2 or F3 but the defect position has not been registered to the image segment DI. Even if an image of which the defect region DA has not been specified by the technician is mixed, the computer 32 sets the label of the image segment DI of the image to "NG1" or "NG2", which is the name of the folder to which the original image belongs.

In step S25, the computer 32 determines whether the image segment DI includes the defect region DA. When a pixel of the second pixel value P2 indicating a defect is included in the α-channel DIα of the image segment DI, the computer 32 determines that the defect region DA is included. When a pixel of the second pixel value P2 is not included in the α-channel DIα of the image segment DI, the computer 32 determines that the defect region DA is not included. When the defect region DA is included in the image segment DI, the computer 32 proceeds to step S26. When the defect region DA is not included in the image segment DI, the computer 32 proceeds to step S27.

In step S26, when the defect region DA is included in the image segment DI, the computer 32 sets the label of the image segment DI to "NG1" or "NG2", which is the name of the defective item folder F2 or F3 to which the original image of the NG image ImD belongs.

In step S27, the computer 32 sets the label of the image segment DI to "OK". That is, even when the image segment DI is not an OK image (or NG image) and includes the α-channel, if the defect region DA is not included in the image segment DI, the computer 32 sets the label of the image segment DI to "OK". In the present embodiment, the processes of step S25 (affirmative determination) and step S26 correspond to a process for assigning a defect label to the image segment DI, in which the second pixel value P2 indicating a defect is included in the other channel, among multiple image segments DI. Further, the processes of step S25 (negative determination) and step S27 correspond to a process for assigning a non-defect label to the image segment DI, in which the second pixel value P2 indicating a defect is not included in the other channel Therefore, the processes of steps S25 to S27 corresponds to one example of "label assignment step".

In step S28, the computer 32 stores the image segment DI in the memory 43 as the RGB image. In this case, when the image segment DI includes the α-channel, the computer 32 removes the α-channel DIα from the labeled image segment DI and stores the labeled image segment data DIm formed by the labeled RGB image in the memory 43 as teaching data. Further, when the image segment DI does not include the α-channel, the computer 32 directly stores the image segment DI formed by the labeled RGB image in the memory 43 as the labeled image segment data DIm. In the present embodiment, the process of step S28 corresponds to one example of "channel removal step" in which the other channel is removed from the image segment DI.

In step S29, the computer 32 determines whether every image segment DI has been processed. When there is an unprocessed image segment DI, the computer 32 returns to step S23 and performs steps S23 to S28 on a subsequent image segment DI to set the label of the subsequent image segment DI. Then, after steps S23 to S28 are performed on every image segment DI and the label is set to every image segment DI (affirmative determination in S29), the computer 32 proceeds to step S30.

In step S30, the computer 32 determines whether every image Im has been processed. When there is an unprocessed image Im, the computer 32 returns to step S21 and performs steps S21 to S29 on a subsequent image Im to set the label to every image segment DI divided from the subsequent image Im. Then, after steps S21 to S29 are performed on every image Im so that every image Im is divided and the label is set to every image segment DI (affirmative determination in S30), the computer 32 ends the image segment generation routine. In this manner, the labeled image segment data DIm is generated as teaching data and stored in the memory 43. For example, when a total of one-hundred pieces of the image data Im are in the folders F1 to F3 and the number of segments is M×N=48, each image Im is divided into 48 segments and 4800 pieces of the labeled image segment data DIm are generated as teaching data.

Next, the learning unit 64 performs supervised learning using the labeled image segment data DIm as teaching data. As shown in FIG. 10C, the learning unit 64 converts the RGB images of the labeled image segment data Dim, excluding the labels, into array data that is formed by arrangement of pixel values. Subsequently, as shown in FIG. 11, the learning unit 64 normalizes the array data and inputs the normalized array data into the input layer 81 of the identifier 66 that has not completed learning. The normalized array data is input to each of the perceptrons x1 to xn in the input layer 81.

For example, the normalized array data of 4800 RGB images of the teaching data DIm is sequentially input to the input layer 81 of the identifier 66. The identifier 66 performs a learning process based on the normalized array data input to the input layer 81 through the neural network, which includes the input layer 81, two to one-hundred and fifty middle layers 82, and the output layer 83. In the learning process, a backpropagation or the like is performed to adjust the weight of each layer. The difference between the output value and the correct label is backpropagated to each layer so that the output value becomes closer to the correct value. In this manner, optimal parameters such as weight W1 and weight W2 are determined.

The teaching data DIm, in which labels are assigned to the image segments DI divided from the image Im, is used so that a high accuracy rate can be expected from the identifier 66. Further, if a desirable accuracy rate is not obtained, a technician changes the number of segments and regenerates the teaching data DIm. In this case, the NG image ImD still includes the alpha channel Imα, which was added at the beginning, and the second pixel value P2, which was assigned to the defect region DA. In this manner, even when the image segment generation unit 62 re-divides the image Im into the number of segments that is respecified by the technician, the label setting unit 63 can set an appropriate label to the image segment DI in accordance with whether the second pixel value P2 is included in the alpha channel DIα of the re-divided image segment DI. Therefore, the technician may specify the defect region DA only once on the image Imd, and this type of task will not be needed for re-segmentation of the image Imd. This facilitates the process of setting a label to each image segment DI divided from the image Im and generating the teaching data Dim, which, in turn, reduces the cost of learning. In the described example, a few NG images Imd are included in one-hundred images Im. However, a massive number of the images Im are actually needed for the learning of the identifier 66 in order to obtain a desirable accuracy rate. Therefore, the specification of the defect region DA on the NG image Imd through a single task reduces the burden of generating the teaching data Dim.

A method for inspection includes an identifier generation step, an image segment acquisition step, and a determination step. In the identifier generation step, the learning unit 64 performs supervised machine learning using the labeled image segment data DIm as teaching data to generate the identifier 66. In the image segment acquisition step, the image segmentation unit 68 obtains the image segments DI by dividing the image Im of the item 12 into the number of segments that is same as that of the image segment DI, which is used for generating the teaching data DIm to generate the identifier 66. In the determination step, the determination unit 69 inputs the image segments DI to the identifier 66 to determine whether the item 12 includes a defect based on the output value output from the identifier 66 as the identification result. The determination unit 69 determines whether the item 12 is a non-defective item or a defective item. In particular, when the item 12 is determined to be a defective item, the computer 32 instructs the defect discarding processor 37 to discard the item 12 from the conveyor 21 with the discarding device 23. Also, when the item 12 is determined to be a defective item by the inspection, the display 35 shows that the item 12 is defective and the type of the defect based on the identification result of the identifier.

As described above, the present embodiment has the following advantages.

(1) With the method for generating labeled image data in accordance with the present embodiment, the labeled image segment data DIm is generated as teaching data, which is used for having the identifier 66 that has not completed learning perform supervised machine learning so that the identifier 66 is generated for the inspection that determines whether the defect Dg is included in the captured image Im of the inspection subject. The method for generating labeled image data includes the channel addition step (step S13), the pixel value assignment step (step S14), the segmentation step (step S22), the label assignment step (steps S25 to S27), and the channel removal step (step S28). In the channel addition step (S13), the alpha channel Imα is appended to the image Im of the inspection subject as an other channel in addition to the color expression channels ImR, ImG, and ImB that form the image Im. In the pixel value assignment step (S14), the second pixel value P2 differing from the first pixel value P1, which is assigned to a defect-free region, is assigned as the pixel value indicting a defect to the region Dα corresponding to the defect region DA in the alpha channel Imα of the image Im. In the segmentation step (S22), the image ImD including the alpha channel Imα is segmented into multiple image segments DI. In the label assignment step (S25 to S27), among the image segments DI, a defect label ("NG1" or "NG2" label) is assigned to the image segment DI including the second pixel value P2 in the alpha channel DIα, and a non-defect label ("OK" label) is assigned to the image segment DI not including the second pixel value P2 in the alpha channel DIα. In the channel removal step (S28), the alpha channel DIα is removed from the image segments DI to generate the labeled image segment data DIm. This facilitates the process of generating the labeled image segment data DIm and reduces the learning cost even when the labeled image segment data DIm serving as teaching data is generated by dividing the captured image Im. For example, even when the number of segments of the image Im is changed for regeneration of the labeled image segment data DIm, a technician does not need to respecify the defect region DA in the image Im whenever the number of segments is changed. This facilitates the process and reduces the learning cost. Further, the image Im is divided to generate the labeled image segment data DIm. This improves the precision compared to when the image Im is not divided. Accordingly, the labeled image segment data DIm with a high precision is used for supervised learning so that the identifier 66 can be generated with a high accuracy rate. Therefore, the deep learning performed using the identifier 66 with a high accuracy rate allows the item 12 to be inspected for defects at a high degree of accuracy.

(2) In the segmentation step (S22), the image ImD including the alpha channel Imα is segmented into multiple image segments DI, in which the adjacent image segments DI are partially overlapped with each other. Accordingly, even when the defect Dg is shown over multiple image segments DI, the defect Dg is split less frequently. Thus, a high accuracy rate is readily obtained when learning is performed using the labeled image segment data DIm.

(3) The alpha channel Imα is used as the other channel. The alpha channel Imα that sets the opacity of an image is used. This allows the second pixel value P2 indicating a defect to be assigned to the region Dα, which corresponds to the defect region DA, relatively easily without affecting the color expression channels of the image Im captured by the camera 31.

(4) When an accuracy rate greater than or equal to a predetermined value is not obtained from the output as a result of the input of test data to the identifier 66, which is generated by performing supervised machine learning using the labeled image segment data DIm as teaching data, the number of segments used in the segmentation step (S22) is changed. In this manner, when an accuracy rate greater than or equal to a predetermined value is not obtained and the number of segments used in the segmentation step (S22) is changed to regenerate the labeled image segment data DIm, the image already includes the alpha channel Imα and the second pixel value P2 indicating a defect. Thus, when the number of segments of the image Im is changed to regenerate the labeled image segment data DIm, there is no need for a technician to operate the input device 34 to specify the defect region DA so that the region Dα is specified and the second pixel value P2 is assigned in the alpha channel Imα.

(5) The method for inspection includes the identifier generation step, the image segment acquisition step, and the determination step. In the identifier generation step, supervised machine learning is performed using the labeled image segment data DIm as teaching data to generate the identifier 66. In the image segment acquisition step, multiple image segments DI are obtained by dividing the image Im of the inspection subject into the number of segments that is same as that of the image segment DI, which is used for generating the teaching data to generate the identifier 66. In the determination step, the image segments DI are input to the identifier 66 to determine whether the item 12 is defective or non-defective based on the output value output from the identifier 66 as the identification result. This facilitates generation of the labeled image segment data DIm provided as teaching data when having the identifier 66 that has not completed learning perform supervised learning. Thus, the item 12 can be inspected for defects at a lower learning cost.

(6) The machine learning is deep learning. Deep learning allows the item 12 to be accurately inspected for defects at a lower learning cost.

(7) The computer 32 executes the programs Pr to generate the labeled image segment data DIm as teaching data, which is used for having the identifier 66 that has not completed learning perform supervised machine learning, so that the identifier 66 is generated for the inspection that determines whether a defect is included in the captured image Im of the item 12. The computer 32 sequentially executes the channel addition step (S13), the pixel value assignment step (S14), the segmentation step (S22), the label assignment step (S25 to S27), and the channel removal step (S28) included in the programs Pr. In the channel addition step (S13), the computer 32 appends the alpha channel Imα to the image Im of the inspection subject as an other channel in addition to the color expression channels that form the image Im. In the pixel value assignment step (S14), the computer 32 assigns the second pixel value differing from the first pixel value P1, which is assigned to a defect-free region, as the pixel value indicting a defect to the region Dα corresponding to the defect region DA in the alpha channel Imα of the image. In the segmentation step (S22), the computer 32 segments the image ImD including the alpha channel Imα into multiple image segments DI. In the label assignment step (S25 to S27), among the image segments DI, the computer 32 assigns a defect label ("NG1" or "NG2" label) to the image segment DI including the second pixel value P2 in the alpha channel Imα and assigns a non-defect label to the image segment DI not including the second pixel value P2 in the alpha channel Imα. In the channel removal step (S28), the computer 32 removes the alpha channel Imα from the image segments DI to generate the labeled image segment data DIm.

The computer 32 executes the programs Pr so that even when the labeled image segment data DIm used as teaching data for supervised machine learning is generated by dividing the captured image Im, the process is facilitated and the learning cost is reduced. For example, even when the number of segments of the image Im is changed for regeneration of the labeled image segment data DIm, a technician does not need to respecify the defect region DA in the image Im whenever the number of segments is changed. This facilitates the process and reduces the learning cost.

(8) The teaching data generation unit 52 serving as one example of a labeled image data generation device generates the labeled image segment data DIm as teaching data, which is used for having the identifier 66 that has not completed learning perform supervised machine learning so that the identifier 66 is generated for the inspection that determines whether a defect is included in a captured image of the inspection subject. The teaching data generation unit 52 includes the channel addition section 61A, the pixel value assignment section 61B, the image segment generation unit 62, and the label setting unit 63. The channel addition section 61A appends the alpha channel Imα to the image Im of the inspection subject as an other channel in addition to one or more channels that form the image Im. The pixel value assignment section 61B assigns the second pixel value P2 differing from the first pixel value P1, which is assigned to a defect-free region, as the pixel value indicting a defect to the region Dα corresponding to the defect region DA in the alpha channel Imα of the image Im. The image segment generation unit 62 divides the image Im including the alpha channel Imα into multiple image segments DI. Among the image segments DI, the label setting unit 63 assigns a defect label ("NG1" label or "NG2" label) to the image segment DI that includes the second pixel value P2 in the alpha channel DIα and assigns a non-defect label ("OK" label) to the image segment DI that does not include the second pixel value P2 in the alpha channel DIα. Further, after the labels are assigned, the alpha channel DIα is removed from the image segments DI to generate the labeled image segment data DIm. In this manner, the teaching data generation unit 52 can assign an appropriate label to each image segment DI even when the labeled image segment data DIm used as teaching data for supervised learning is generated by dividing the captured image Im as long as the defect region DA is specified once on the original image. For example, if a desirable accuracy rate is not obtained from the identifier 66 as a result of the learning, the number of segments of the image Im is changed to regenerate the labeled image segment data Dim. In this case, the alpha channel Imα is already added to the image Im and the second pixel value P2 is already assigned to the region Dα corresponding to the defect region DA. Thus, a technician may only change the number of segments and start dividing the image ImD with the computer 32. That is, the technician does not have to specify the defect region DA on the image Im whenever the number of segments is changed. This facilitates generation of the labeled image segment data DIm and reduces the learning cost.

(9) The inspection device 30 inspects the item 12 for defects based on the captured image Im of the item 12, or the inspection subject. The inspection device 30 includes the teaching data generation unit 52, the identifier 66, the image segmentation unit 68, and the determination unit 69. The identifier 66 is generated through performance of supervised machine learning using the labeled image segment data DIm as teaching data, which is generated by the teaching data generation unit 52. The image segmentation unit 68 obtains multiple image segments DI by dividing the image Im of the item 12, or the inspection subject, into the number of segments that is same as that of the image segment DI, which is used for generating the labeled image segment data DIm to generate the identifier 66. The identifier 66 receives the image segments DI obtained by the image segmentation unit 68 and outputs an identification result. The determination unit 69 determines whether the item 12 is defective based on the identification result from the identifier 66. The inspection device 30 facilitates generation of the labeled image segment data DIm used for learning of the identifier 66 that has not completed learning thereby allowing the item 12 to be inspected for defects at a lower learning cost.

Second Embodiment

A second embodiment will now be described with reference to the drawings. The second embodiment differs from the first embodiment in that information on the type of label is also added to the alpha channel. Thus, the configuration same as the first embodiment will not be described, and only the differences will be described.

Figure 14A:
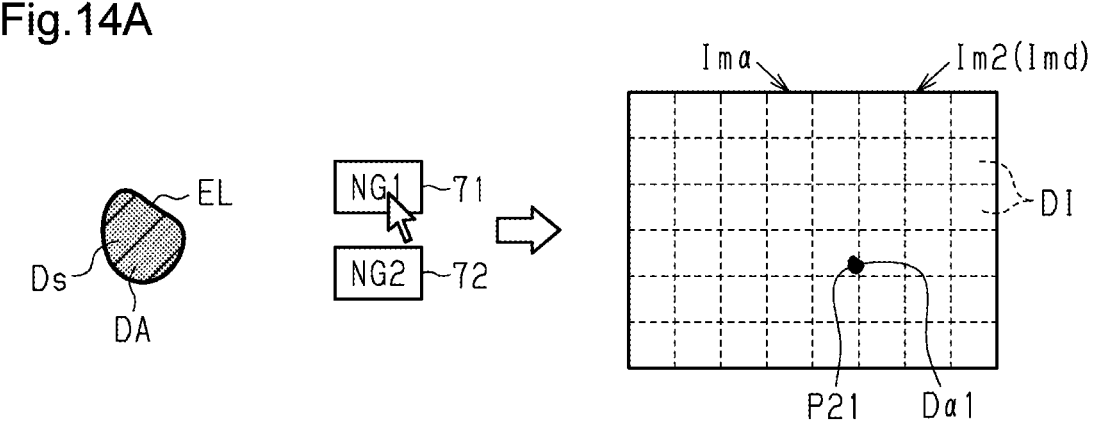
FIGS. 14A and 14B are schematic diagrams illustrating a process for assigning a second pixel value to a defect region in the alpha channel in accordance with a second embodiment.
Figure 14B:
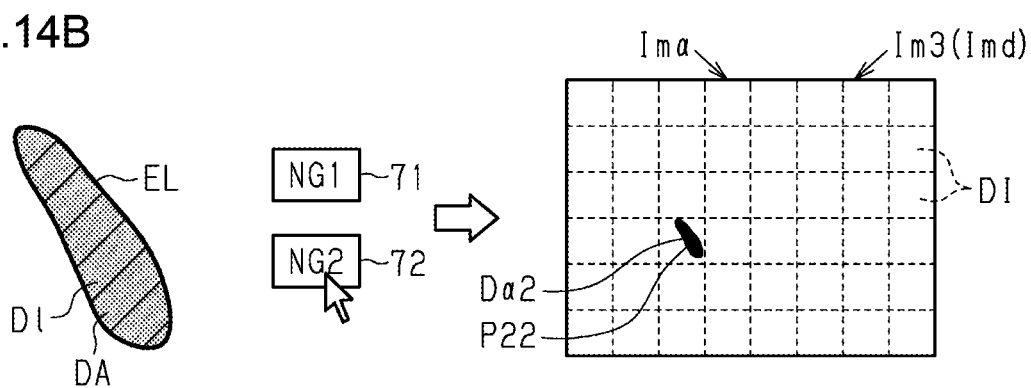

As shown in FIG. 14, the defect position registration unit 61 performs a process partially different from that of the first embodiment. The defect position registration unit 61 shows the contents shown in FIGS. 14A and 14B on the display 35. When an NG image belonging to the defective item folder F2 named "NG1" is displayed, the display 35 shows input portions 71 and 72 that specify the type of defects. In the example shown in FIG. 14A, the input portion 71 specifies the type "NG1", and the input portion 72 specifies the type "NG2". A technician operates the pointing device such as a mouse or an electronic pen to draw the border line EL along the contour of defect Ds so that the defect region DA is specified. Then, the technician selects the input portion 71 that corresponds to the type of the defect Ds with the mouse or the like. Subsequently, the channel addition section 61A adds the alpha channel Imα to the NG image Im2 shown in the right side of FIG. 14A. Also, the pixel value assignment section 61B assigns a second pixel value P21 corresponding to the type of the defect selected with the input portion 71 to the region Dα1, which corresponds to the defect region DA in the added alpha channel Imα of the image Im.

In the example shown in FIG. 14B, a technician operates the pointing device such as a mouse or an electronic pen to draw the border line EL along the contour of defect D1 so that the defect region DA is specified and input. Then, the technician selects the input portion 72 that corresponds to the type of the defect D1 with the mouse or the like. Then, the defect position registration unit 61 adds the alpha channel Imα to the NG image Im3 shown in the right side of FIG. 14B and assigns a second pixel value P22 corresponding to the type of the defect, which is selected with the input portion 72, to the region Dα2 corresponding to the defect region DA in the image Im in the added alpha channel Imα. In the examples shown in FIG. 14, the type of a defect is classified in accordance with the size of the defect. Alternatively, the type of a defect may be classified in accordance with other characteristics.

The operation of the inspection device 30 in accordance with the second embodiment will now be described with reference to FIG. 15. The defect position registration unit 61 performs the process shown in FIG. 14. Accordingly, the second pixel value P21 or P22 corresponding to the type of the defect is set to the region Dα1 or Dα2 corresponding to the defect region DA in the alpha channel Imα. The computer 32 performs an image segment generation routine illustrated in FIG. 15 to function as the image segment generation unit 62. The image segment generation process performed by the computer 32 will now be described.

Figure 15:
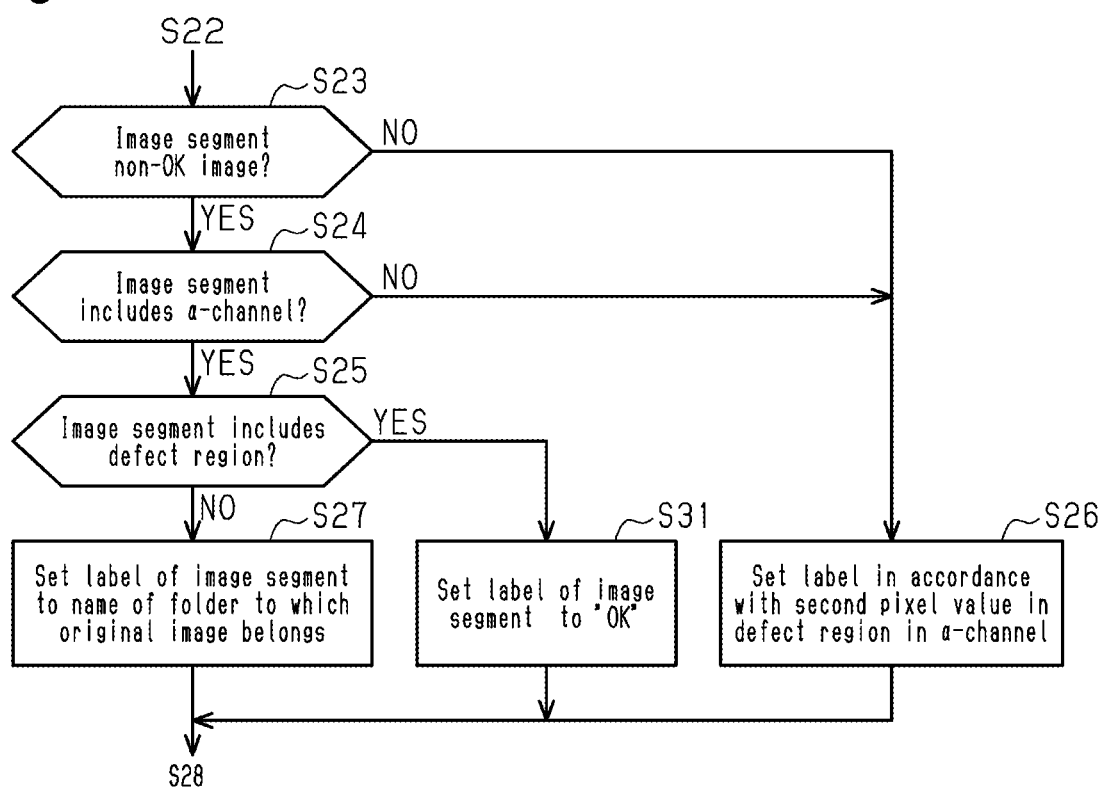
FIG. 15 is a flowchart illustrating a main part of an image segment generation routine in which labeled image segments are generated as teaching data.

In FIG. 15, steps S23 to S27 are the same as those in the first embodiment and step S31 differs from the first embodiment. Further, steps S21, S22, and S28 to S30 illustrated in FIG. 13 are the same as those in the first embodiment and thus omitted in FIG. 15. The computer 32 displays the first image read from one of the folders F1 to F3 (S21). In advance, a technician inputs the desirable number of segments M×N in the input field for the number of segments on the setting screen shown on the display 35. The computer 32 segments the image into M×N image segments (S22).

In step S23 shown in FIG. 15, the computer 32 determines whether the image segment DI is an OK image. When the image segment DI is not an OK image, the computer 32 proceeds to step S24. When the image segment DI is an OK image, the computer 32 proceeds to step S26. In step S26, the computer 32 sets the label of the image segment DI to "OK", which is the name of the folder to which the original image belongs.

In step S24, the computer 32 determines whether the image segment DI includes the α-channel. When the image segment DI includes the α-channel, the computer 32 proceeds to step S25. When the image segment DI does not include the α-channel, the computer 32 proceeds to step S26. The name of the folder "NG1" or "NG2" of the original image is set as the label of the image segment DI, which is not an OK image and does not include the α-channel.

In step S25, the computer 32 determines whether the image segment DI includes the defect region DA. When a pixel of the second pixel value P2 indicating a defect is included in the α-channel DIα of the image segment DI, the computer 32 determines that the defect region DA is included. When a pixel of the second pixel value P2 indicating a defect is not included in the α-channel DIα of the image segment DI, the computer 32 determines that the defect region DA is not included. When the defect region DA is included in the image segment DI, the computer 32 proceeds to step S31. When the defect region DA is not included in the image segment DI, the computer 32 proceeds to step S27.

In step S31, the computer 32 sets a label corresponding to the second pixel value P2 in the defect region Dα in the alpha channel DIα. Specifically, when the second pixel value P2 in the defect region Dα in the alpha channel Imα is the second pixel value P21 indicating a first defect Ds, the computer 32 sets a label "NG1" in correspondence with the second pixel value P21. Further, when the second pixel value P2 in the defect region Dα in the alpha channel Iima is the second pixel value P21 indicating a second defect D1, the computer 32 sets a label "NG2" in correspondence with the second pixel value P22.

In step S27, the computer 32 sets the label of the image segment DI to "OK". That is, even when the image segment DI is not an OK image (or NG image) and includes the α-channel, if the defect region DA is not included in the image segment DI, the computer 32 sets the label of the image segment DI to "OK".

When multiple types of defects are included in the image segments DI divided from the image Im, appropriate labels can be set to the image segments DI in correspondence with the types of the defects. Thus, a high accuracy rate can be expected to be obtained from the identifier 66 that is generated after performing the learning. Further, even if a technician changes the number of segments when a desirable accuracy rate is not obtained, the re-divided image segments DI still include the initially-added α-channel Imα and the second pixel value P21 or P22 assigned to the defect region Dα1 or Dα2. Thus, labels can automatically be set to the re-divided image segments DI in accordance with the second pixel values P21 and P22 and whether the second pixel values P21 and P22 are included in the α-channel DIα. In this manner, the technician may specify and input the defect region DA through merely a single task on the image Im and this task will not be required for re-segmentation of the image Im. This facilitates the process of setting labels to each image segments DI divided from the image Im and generating the labeled image segment data DIm. This further reduces the cost of learning.

The second embodiment has the following advantage in addition to the advantages of the first embodiment.

(10) There are multiple types of the defect D. In the pixel value assignment step (S14), when the second pixel value P2 is assigned to the alpha channel Imα, the second pixel value P21 and P22, which are different, are added in accordance with the type the defect D. In the label assignment step (S25 to S27), a different defect label ("NG1" label or "NG2" label) is assigned to the image segment DI including the second pixel value P2 in accordance with the second pixel values P21 and P22. In this manner, the labeled image segment data DIm is generated including the defect label that differs in accordance with the type of the defect D.

The embodiments are not limited to the above description and may be modified as follows.

The alpha channel that is an auxiliary channel serving as one example of the other channel does not need to have 256 gradations and may have 64, 32, 16, 8, 4, or 2 gradations. For example, the second pixel value used for indicating the type of a defect may be set to a value that combines information other than the type of a defect.

The size and the type of the defect Dg may be combined to assign different second pixel values to the defects belonging to the same size range if the defects are of different types. With this configuration, when the image includes a defect, the defect can be identified by the combination of the size and the type of the defect.

The image is not limited to a color image like the RGB image and may be a grayscale image. That is, the image captured by the camera 31 may have a single channel. In this case, the defect position registration unit 61 adds the alpha channel to the grayscale image as the other channel and assigns the second pixel value differing from the first pixel value, which is assigned to a defect-free region, to the region corresponding to the defect region in the added alpha channel.

The present disclosure may be applied to semi-supervised learning in which images with correct labels and images without correct labels are mixed.

The item 12 of the inspection may be any item having any shape and size. The item 12 may be, for example, a container, such as a plastic bottle and a bin, a food product, a beverage, an electronic component, an electronic product, an everyday item, a part, a member, and a raw material such as powders and a liquid. The item 12 may only be an item that can be inspected for defects from the external appearance. Further, the inspection of the item 12 performed by the inspection device 30 is not limited to the inspection of the external appearance of the item 12. For example, the inside of the item 12 may be inspected in a non-destructive manner using an image captured by emitting ultrasound waves or X-ray.

The inspection subject is not limited to the item 12 and may be a photograph of a building, an aerial photograph of topography, a photograph of the sky, an astrophotograph, a micrograph, or the like. The labeled image segment data may be generated by dividing these photographs.

The labeled image data generation device may be configured as a device separate from the inspection device 30.

The supervised or semi-supervised machine learning is not limited to deep learning. For example, the present application may be applied to machine learning performed by a support vector machine (SVM) or a neural network having a single middle layer.

The computer 32 may include a graphics processing unit (GPU). In this case, it is preferred that the deep-learning unit 53 including the identifier 66 is mounted on the GPU. In this case, the identifier data CD is stored in a GPU memory. Also, the devices may be configured separately including the inspection functionality and the learning functionality for having the identifier 66 that has not completed learning perform learning. Specifically, the labeled image data generation device that includes the learning functionality for having the identifier 66 that has not completed learning perform learning may be a device separate from the inspection device that inspects an item using the identifier 66, which has completed learning with the labeled image data generation device. In this case, the labeled image data generation device includes the GPU, and the GPU includes the deep-learning unit 53. Preferably, the inspection device includes a labeled image data generation device for performing additional learning. In this case, since the processing load when performing additional learning is small, the inspection device does not have to include the GPU, and the CPU may include the deep-learning unit 53.

DESCRIPTION OF THE REFERENCE NUMERALS

11) inspection system; 12) item as one example of inspection subject; 20) transfer device; 21) conveyor; 22) sensor; 23) discarding device; 30) inspection device; 31) camera; 32) computer; 33) PLC; 34) input device; 35) display; 36) camera trigger processor; 37) defect discarding processor; 41) CPU; 42) memory; 43) auxiliary memory; 51) control unit; 52) teaching data generation unit as one example of labeled image data generation device; 53) deep-learning unit; 54) inspection processing unit; 61) defect position registration unit; 61A) channel addition section; 61B) pixel value assignment section; 62) image segment generation unit as one example of segmentation unit; 63) label setting unit as one example of label assignment unit; 64) learning unit; 65) inference unit; 66) identifier; 67) image acquisition unit; 68) image segmentation unit as one example of image segment acquisition unit; 69) determination unit; 81) input layer; 82) middle layer; 83) output layer; X) transfer direction; C) controller; Pr) program; IG) image data group; TrD) training data group; Im) image data (image); Imd) defective item image (NG image); Imα) alpha channel as one example of an other channel; ImD) defective item image (NG image); D, Ds, Dl) defect; Dg) defect; DA) defect region; Dα, Dα1, Dα2) region (defect region); P1) first pixel value; P2) second pixel value; P21) second pixel value; P22) second pixel value; DI) image segment (image segment data); DIα) alpha channel; ΔL) overlap amount; TsD) test data group; DIm) labeled image data as teaching data and one example of labeled image data and test data.

The invention claimed is:

1. A method for inspecting an inspection subject, the method comprising:
   a channel addition step including adding, in addition to one or more channels forming the image, an other channel to the captured image of the inspection subject;
   a pixel value assignment step including assigning a second pixel value to a region corresponding to a defect region in the image in the other channel, the second pixel value differing from a first pixel value assigned to an other region that is defect-free as a pixel value indicating a defect;
   a segmentation step including segmenting the image including the other channel into multiple image segments;
   a label assignment step including assigning a defect label to an image segment of the image segments, in which the second pixel value is included in the other channel, and assigning a non-defect label to an image segment of the image segments, in which the second pixel value is not included in the other channel; and
   a channel removal step including removing the other channel from the image segment to generate labeled image data;
   a determination step including determining whether an inspection subject is defective based on an output value output from an identifier configured with the labeled image data; and
   a control step including controlling the inspection device to discard the inspection subject when the inspection subject is determined to be defect.

2. The method according to claim 1, wherein
   there are multiple types of the defect,
   in the pixel value assignment step, when assigning the second pixel value to the other channel, a different second pixel value is assigned in accordance with the type of the defect, and
   in the label assignment step, a different defect label is assigned to the image segment including the second pixel value in accordance with the value of the second pixel value.

3. The method according to claim 1, wherein in the segmentation step, the image including the other channel is segmented into the multiple image segments in which adjacent image segments are partially overlapped with each other.

4. The method according to claim 1, wherein the other channel is an alpha channel.

5. The method according to claim 1, wherein if an accuracy rate greater than or equal to a predetermined value is not obtained from an output when test data is input to the identifier generated by performing supervised or semi-supervised machine learning using the labeled image data as teaching data, a number of segments in the segmentation step is changed.

6. The method according to claim 1, further comprising:
   an identifier generation step including generating the identifier by performing supervised or semi-supervised machine learning using the labeled image data as teaching data; and
   wherein the determination step includes obtaining multiple image segments by segmenting an image of the inspection subject into a number of segments that is the same as a number of segments of the image segments used for generating the identifier.

7. The method according to claim 6, wherein the machine learning is deep learning.

8. A program stored in a non-transitory computer readable medium configured to be executed by a computer, the program including instructions comprising:
   adding, with the computer and in addition to one or more channels forming the image, an other channel to the captured image of the inspection subject;
   assigning, with the computer, a second pixel value to a region corresponding to a defect region in the image in the other channel, the second pixel value differing from a first pixel value assigned to an other region that is defect-free as a pixel value indicating a defect;
   segmenting, with the computer, the image including the other channel into multiple image segments;
   assigning, with the computer, a defect label to an image segment of the image segments, in which the second pixel value is included in the other channel, and assigns a non-defect label to an image segment of the image segments, in which the second pixel value is not included in the other channel;
   removing, with the computer, the other channel from the image segment to generate labeled image data;
   determining whether an inspection subject is defective based on an output value output from an identifier configured with the labeled image data; and
   controlling the inspection device to discard the inspection subject when the inspection subject is determined to be defect.

9. An inspection device, the inspection device comprising:
   a channel addition unit that adds, in addition to one or more channels forming the image, an other channel to the captured image of the inspection subject;
   a pixel value assignment unit that assigns a second pixel value to a region corresponding to a defect region in the image in the other channel, the second pixel value differing from a first pixel value assigned to an other region that is defect-free as a pixel value indicating a defect;
   a segmentation unit that divides the image including the other channel into multiple image segments; and
   a label assignment unit that assigns a defect label to an image segment of the image segments, in which the second pixel value is included in the other channel, assigns a non-defect label to an image segment of the image segments, in which the second pixel value is not included in the other channel, and removes the other channel from the image segment after the label is assigned to generate labeled image data;
   a determination unit that determines whether an inspection subject is defective based on an output result from an identifier configured with the labeled image data; and
   a discarding device configured to discard the inspection subject in response to receiving a signal indicating the inspection subject is defective.

10. The inspection device according to claim 9, further comprising:
    an identifier generated by performing supervised or semi-supervised machine learning using the labeled image data;
    an image segment acquisition unit that obtains multiple image segments by dividing an image of the inspection subject into a number of segments that is the same as a number of segments of the image segments used for generating the identifier; and
    wherein the determination unit determines whether the inspection subject is defective based on an output result from the identifier when the image segments obtained by the image segment acquisition unit is input to the identifier.

* * * * *

UNITED STATES PATENT AND TRADEMARK OFFICE
CERTIFICATE OF CORRECTION

PATENT NO. : 11,983,863 B2
APPLICATION NO. : 17/258056
DATED : January 5, 2021
INVENTOR(S) : Kazumi Banno et al.

It is certified that error appears in the above-identified patent and that said Letters Patent is hereby corrected as shown below:

On the Title Page

Item (73) The Assignee should be: Kabushiki Kaisha N-Tech, Kabushiki Kaisha Yakult Honsha, and Tohoshoji Kabushiki Kaisha Signed and Sealed this
Tenth Day of December, 2024

Katherine Kelly Vidal
*Director of the United States Patent and Trademark Office*